US011778984B2

(12) United States Patent
McMullen

(10) Patent No.: US 11,778,984 B2
(45) Date of Patent: Oct. 10, 2023

(54) NAVIGATIONAL SAFETY SYSTEM AND METHOD FOR VISUALLY IMPAIRED QUADRUPEDS

(71) Applicant: Matthew Bates McMullen, Marietta, GA (US)

(72) Inventor: Matthew Bates McMullen, Marietta, GA (US)

(*) Notice: Subject to any disclaimer, the term of this patent is extended or adjusted under 35 U.S.C. 154(b) by 152 days.

(21) Appl. No.: 17/588,577

(22) Filed: Jan. 31, 2022

(65) Prior Publication Data
US 2022/0248638 A1 Aug. 11, 2022

Related U.S. Application Data

(60) Provisional application No. 63/147,198, filed on Feb. 8, 2021.

(51) Int. Cl.
| *A01K 1/00* | (2006.01) |
| *A01K 11/00* | (2006.01) |
| *A01K 27/00* | (2006.01) |
| *A01K 29/00* | (2006.01) |
| *A01K 15/02* | (2006.01) |

(52) U.S. Cl.
CPC .......... *A01K 11/008* (2013.01); *A01K 15/023* (2013.01); *A01K 27/002* (2013.01); *A01K 27/009* (2013.01); *A01K 29/005* (2013.01)

(58) Field of Classification Search
CPC .. A01K 11/008; A01K 15/023; A01K 27/002; A01K 27/009; A01K 29/005
See application file for complete search history.

(56) References Cited

U.S. PATENT DOCUMENTS

| 6,367,424 B1* | 4/2002 | Higham | A01K 13/006 119/766 |
| 6,694,923 B1* | 2/2004 | Fouche | A01K 27/005 119/792 |
| 7,284,504 B1* | 10/2007 | Purschwitz, Jr. | A01K 1/0263 119/792 |
| 7,891,322 B2* | 2/2011 | Bennett | A01K 27/005 119/856 |
| 8,109,240 B2* | 2/2012 | Matusak | A01K 15/04 119/758 |
| D683,913 S * | 6/2013 | Bordeaux | D30/152 |
| 9,004,016 B2* | 4/2015 | Stratton | A01K 15/00 119/766 |
| 9,883,656 B1* | 2/2018 | Turner | A01K 27/002 |
| 9,999,392 B1* | 6/2018 | Wordham | A61B 5/02438 |
| 10,117,802 B2 | 11/2018 | Kasravi et al. | |
| 11,291,188 B2* | 4/2022 | Duray | B68C 1/20 |

(Continued)

*Primary Examiner* — Quang Pham
(74) *Attorney, Agent, or Firm* — H. Brock Kolls

(57) ABSTRACT

The present invention relates to a navigational safety system for visually impaired quadrupeds. An onlay has a right side, a left side, a top side, a bottom side, and a chest side. The onlay is retrofittable to or manufactured into a harness worn by a quadruped. Distance sensors and vibrators are integrated into the onlay and configured to determine the distance between obstacles and provide localized vibration stimulation to the quadruped. The vibration causes the quadruped to change course avoiding the obstacle. In this regard, the localized vibrations are positioned on the right torso, the left torso, and the chest of the quadruped.

20 Claims, 11 Drawing Sheets

(56) References Cited

U.S. PATENT DOCUMENTS

| | | | |
|---|---|---|---|
| 11,617,532 B2* | 4/2023 | Kuenzi | A61B 5/318 |
| | | | 600/300 |
| 2002/0152970 A1* | 10/2002 | Takeda | A01K 15/02 |
| | | | 119/719 |
| 2008/0088469 A1 | 1/2008 | Doemens et al. | |
| 2008/0134991 A1* | 6/2008 | DePass | A01K 13/006 |
| | | | 119/856 |
| 2010/0212269 A1* | 8/2010 | Dell'Agnese | A01K 27/006 |
| | | | 119/858 |
| 2013/0306001 A1* | 11/2013 | Bordeaux | A01K 13/006 |
| | | | 119/850 |
| 2016/0302390 A1* | 10/2016 | Allen | A01K 11/008 |
| 2017/0196668 A1* | 7/2017 | Austin | A61D 17/008 |
| 2018/0110672 A1* | 4/2018 | Kasravi | A01K 27/008 |
| 2019/0053762 A1* | 2/2019 | Saigh | A61B 5/682 |
| 2019/0054347 A1* | 2/2019 | Saigh | G06F 18/00 |
| 2019/0200577 A1* | 7/2019 | Kath | A61B 5/6831 |
| 2019/0374122 A1* | 12/2019 | Kuenzi | A61B 5/6831 |
| 2020/0288675 A1* | 9/2020 | Auld | A01K 27/002 |
| 2020/0331554 A1* | 10/2020 | Monzidelis | B62K 5/01 |
| 2020/0359605 A1* | 11/2020 | Maher | A01K 27/009 |
| 2021/0093230 A1* | 4/2021 | Schkommodau | A61B 5/1127 |
| 2021/0368738 A1* | 12/2021 | Conen | B68B 1/00 |
| 2022/0159931 A1* | 5/2022 | Chapman | B65H 75/406 |
| 2022/0183258 A1* | 6/2022 | Vucaj | A01K 27/009 |
| 2023/0217900 A1* | 7/2023 | Kendall | A01K 1/0263 |
| | | | 119/856 |
| 2023/0232789 A1* | 7/2023 | Hamamjy | A01K 27/003 |
| | | | 119/792 |

* cited by examiner

NAVIGATIONAL SAFETY SYSTEM AND METHOD FOR VISUALLY IMPAIRED QUADRUPEDS

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that is a continuation in part of a U.S. provisional application, Ser. No. 63/147,198, inventor Matthew Bates McMullen, entitled "NAVIGATION HARNESS FOR VISUALLY IMPAIRED QUADRUPEDS", filed Feb. 8, 2021.

TECHNICAL FIELD OF THE INVENTION

This invention relates to a navigational safety system for visually impaired quadrupeds and particularly to an onlay which comprises a navigational control system used with a harness, the combination is worn by a quadruped and used for obstacle avoidance.

BACKGROUND OF THE INVENTION

Before our invention, a shortcoming of visually impaired quadrupeds such as cats and dogs was that they had a difficult time walking around without bumping into obstacles often injuring themselves. Unlike humans with impaired vision who can use hand touch, canes, and other tools to avoid obstacles, quadrupeds lack such dexterity and tools.

Additional shortcomings can be the impact psychologically and emotionally on both the visually impaired quadruped and the quadruped's human family having to endure the experience of dealing with the disability daily. Eyesight can fade in some quadrupeds at an early age creating a long-lasting disability.

The present invention addresses these and other shortcomings by providing a navigational safety system and method for visually impaired quadrupeds. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a navigational safety system for visually impaired quadrupeds comprising a microcontroller, and an onlay having a right side, a left side, a top side, a bottom side, and a chest side. The onlay is retrofittable to a harness worn by a quadruped. The bottom side is removably secured to the harness such that the left side is on the left side of the quadruped's torso, the right side is on the right side of the quadruped's torso, and the chest side is on the chest of the quadruped's torso.

More than one distance sensor is operationally related to the microcontroller and configured to determine the distance between the distance sensor and an object. At least one distance sensor is located on each of the left side, the right side, and the chest side.

More than one vibrator is configured to vibrate when energized with a stimulation signal. The vibrator is operationally related to the microcontroller and configured to provide localized vibration stimulation proximate the vibrator to the quadruped's torso. At least one vibrator is located on each of the left side, the right side, and the chest side.

A memory is operationally related to the microcontroller, the memory is encoded with instructions that when executed by the microcontroller perform the steps of administering the stimulation signal to the vibrator in a first side position on the right side or the left side depending on preset preference set in the navigational control system when the distance sensor on the right side detects the object, causing the quadruped to change course avoiding the object. Administering the stimulation signal to the vibrator in a second side position, the second side position is on the left side or the right side opposite the first side position when the distance sensor positioned on the left side detects the object, causing the quadruped to change course avoiding the object. And administering the stimulation signal to the vibrator positioned on the chest side when the distance sensor positioned on the chest side detects the object and pathways to the right or the left of the object are blocked, causing the quadruped to change course avoiding the object. In this regard, the quadruped that is visually impaired is alerted through localized vibration stimulation to the relative position of the object prior to inadvertently walking into the object.

Additional shortcomings of the prior art are overcome and additional advantages are provided through the provision of a navigational safety method for visually impaired quadrupeds. The method comprises the steps of attaching an onlay to a harness. The onlay has a right side, a left side, a top side, a bottom side, and a chest side. And securing the harness and the onlay combination to a quadruped. The bottom side is removably secured to the harness such that the left side is on the left side of the quadruped torso, the right side is on the right side of the quadruped torso, and the chest side is on the chest of the quadruped torso. More than one distance sensor is operationally related to a microcontroller and configured to determine the distance between the distance sensor and an object. At least one distance sensor is located on each of the left side, the right side, and the chest side. More than one vibrator is configured to vibrate when energized with a stimulation signal. The vibrator is operationally related to the microcontroller and configured to provide localized vibration stimulation proximate the vibrator to the quadruped. At least one vibrator is located on each of the left side, the right side, and the chest side.

Continuing with the step of administering the stimulation signal to the vibrator in a first side position on the right side or left side depending on preset preference set in the navigational control system when the distance sensor on the right side detects the object, causing the quadruped to change course avoiding the object. Administering the stimulation signal to the vibrator in a second side position on the left side or the right side opposite the first side position when the distance sensor positioned on the left side detects the object, causing the quadruped to change course avoiding the object. And administering the stimulation signal to the vibrator positioned on the chest side when the distance sensor positioned on the chest side detects the object and pathways to the right or the left of the object are blocked, causing the quadruped to change course avoiding the object. In this regard, the quadruped that is visually impaired is alerted through localized vibration stimulation to the relative position of the object prior to inadvertently walking into the object.

Additional shortcomings of the prior art are overcome and additional advantages are provided through the provision of a navigational safety system for visually impaired quadrupeds comprising a microcontroller, a harness that is worn by a quadruped, and an onlay having a right side, a left side, a top side, a bottom side, and a chest side. The bottom side of the onlay is fastened to the harness such that the left side is on the left side of the quadruped's torso, the right side is on the right side of the quadruped's torso, and the chest side is on the chest of the quadruped's torso.

More than one distance sensor is operationally related to the microcontroller and configured to determine the distance between the distance sensor and an object, at least one distance sensor is located on each of the left side, the right side, and the chest side.

More than one vibrator is configured to vibrate when energized with a stimulation signal. The vibrator is operationally related to the microcontroller and configured to provide localized vibration stimulation proximate the vibrator to the quadruped's torso. At least one vibrator is located on each of the left side, the right side, and the chest side.

A memory is operationally related to the microcontroller, the memory is encoded with instructions that when executed by the microcontroller perform the steps of administering the stimulation signal to the vibrator in a first side position on the right side or left side depending on the preset preference set in the navigational control system when the distance sensor on the right side detects the object. Administering the stimulation signal to the vibrator in a second side position, the second side position is on the left side or the right side opposite the first side position when the distance sensor positioned on the left side detects the object. And administering the stimulation signal to the vibrator positioned on the chest side when the distance sensor positioned on the chest side detects the object and pathways to the right or the left of the object are blocked. In this regard, the quadruped that is visually impaired is alerted through localized vibration stimulation to the relative position of the object prior to inadvertently walking into the object.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
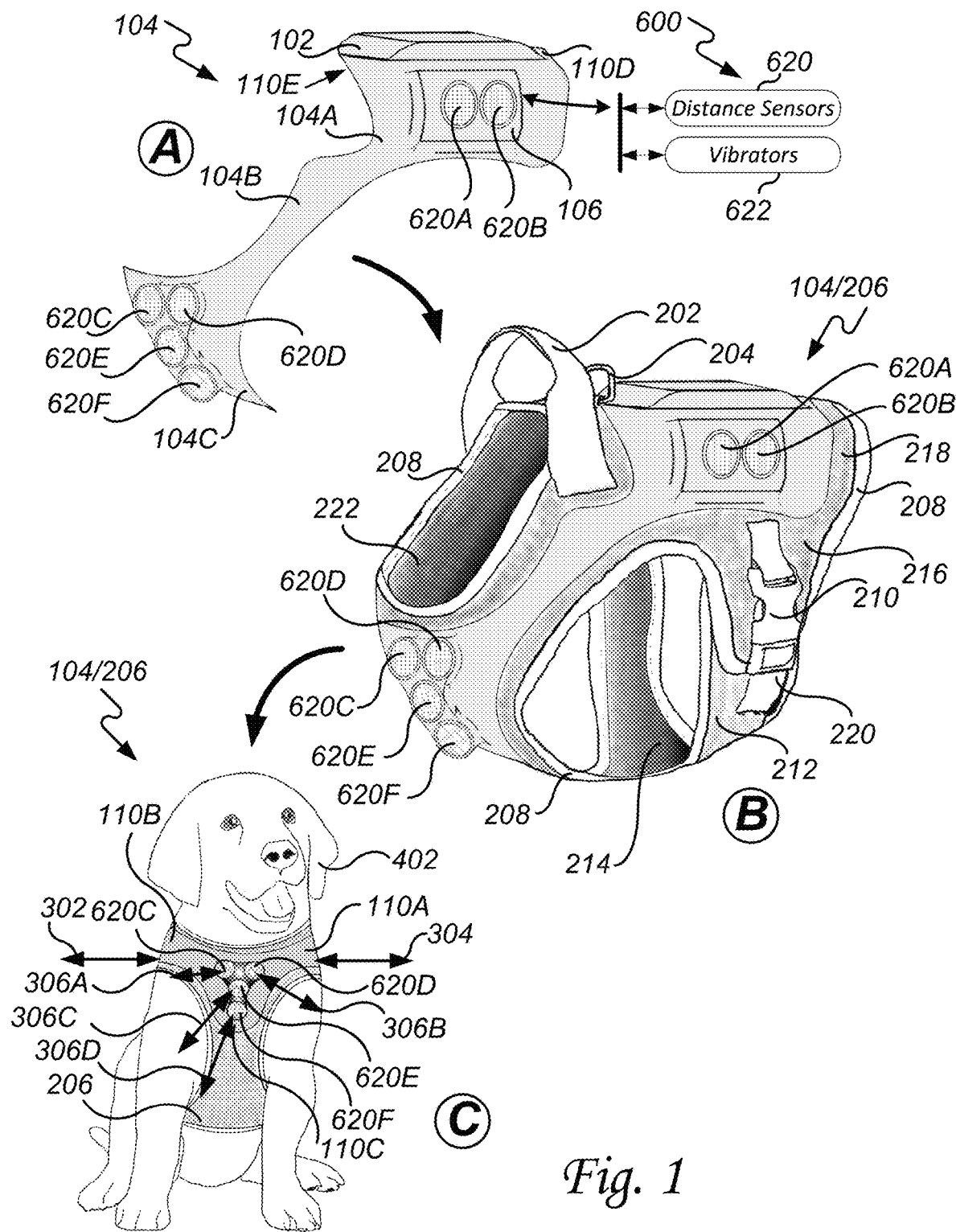
FIG. 1 illustrates one example of a navigational safety system for visually impaired quadrupeds.

The detailed description explains the preferred embodiments of the invention, together with advantages and features, by way of example with reference to the drawings.

DETAILED DESCRIPTION OF THE INVENTION

In the present invention, the term "quadruped" is intended to mean an animal that has four legs. In general, dogs, cats, and other animals with four legs are considered quadrupeds.

In the present invention, the term "onlay" is intended to mean something that is laid or applied over something else, as to add to a surface. As an example and not a limitation, the navigational control system 600 of the present invention is packaged into enclosure 102 which is part of onlay 104. The onlay 104 can be removably secured on top of a harness 206 in a retrofit manner or integrated on top of the harness 206 permanently. The harness 206 is worn by a quadruped 402.

For disclosure purposes, the term "object" and "obstacle" can be interchangeably used. In this regard, object 508 can also be referred to as obstacle 508, and geofenced objects 508/518 can also be referred to as geofenced obstacles 508/518.

An advantage in the present invention is that a quadruped 402 that is blind, partially blind, or otherwise vision impaired can navigate safely around obstacles 508/518 while in motion. This is accomplished by administering, in combination with the use of a plurality of distance sensors 620, a series of stimulating vibrators 622, and/or playing audio commands 608/610 that are heard by the quadruped 402. In this regard, the quadruped 402 wears the combination onlay 104 and harness 206. The navigational control system 600 of the present invention is packaged in enclosure 102 that is part of onlay 104. The onlay 104 can either be retrofitted to a commercially available harness 206 or manufactured permanently into a harness 206.

In an exemplary embodiment, in operation, the navigational control system 600 operates in at least two modes of operation. The first mode of operation is an active mode in which the navigation control system 600 is constantly measuring distances, performing necessary and appropriate calculations, triggering vibration patterns as necessary to guide the quadruped 402, collecting data including data related to obstacle avoidance, and data communicating data to user 302 computing device 802 who is using a mobile software application or data communicating data to a remote data processing resource 806 that is accessible to user 302 by way of a computing device 802.

The second mode of operation is a passive mode in which the navigational control system 600 is attempting to save power by only measuring whether the quadruped 402 has resumed standing and/or motion. In practice, this means that passive mode automatically enables after some user 302 determined duration of quadruped 402 idleness, ceasing distance sensing, and vibration triggering, and instead only measuring the quadruped's 402 acceleration to determine renewed standing or motion. When the navigational control system 600 detects that the quadruped 402 has stood up to move or has begun moving, the passive mode of operation is disengaged and the active mode of operation is reengaged, resuming normal and optimal object avoidance, data collection functionality, and other functionality.

Following the initial calibration and preference settings of the navigational control system 600, and initial acclimation of the quadruped 402 to the likely novel experience of vibration (through the consistent and ethical means of classical conditioning), the quadruped 402 will have appropriately associated the varying vibrational stimuli to the presence and danger of approaching obstacles 508/518 from various directions.

This navigational control system 600 is intended to be used as often as the user 302 and/or quadruped 502 is comfortable with and the programming of the two operational modes (passive mode of operation and active mode of operation) enables the quadruped 402 to potentially keep the harness 206 on indefinitely without irritation or discomfort. At the end of each day when the quadruped 402/user 302 prepare for bed, or when the current power source 604 is depleted, the user 302 can remove the power source 604 and charge it overnight, replace it with a second already charged power source 604, or plug a power transformer into the device charger 606 and recharge the power source 604 rechargeable batteries while they remain sealed in the navigational control system 600 enclosure 102.

As the quadruped 402 wearing the device regularly and user 302 becoming accustomed to the information that the harness communicates, user 302 can visualize the collected data that represents the quadruped's 402 success rate at avoiding obstacles 508/518 on a computing device 802 mobile software application. This mobile software application can receive data wirelessly from the navigational control system 600 or the remote data processing resource 806 and provide it to user 302 in a visual and understandable format. Additionally, the mobile application is where wireless connection to the navigational control system 600 can be initiated and user 302 can view power source 604 status as well as view informative videos accessible online over the global network 800 such as the Internet on how to use the present invention and learn how to train the quadruped 402. Additionally, the mobile application enables access to and adjustment of settings such as minimum/maximum vibration amplitude/magnitude/speed, critical distance measurement ranges, preset preferences on which and when each of the vibrators 622 vibrates in response to each of the distance sensors 620 detections of obstacles 508, and the location of and other settings as may be required and/or desired in a particular embodiment.

With regards to training the quadruped 402, in an exemplary embodiment, vibration can be used to move the quadruped 402 away from obstacles. In this regard, a vibration on the left torso of the quadruped means move right, a vibration on the right torso means move left, and vibration on the chest of the quadruped 402 means stop and turn around. In another exemplary embodiment, the quadruped 402 can be trained to respond to vibration differently and the navigational control system 600 can be reprogrammed with preset preferences as to how vibration is administered or otherwise applied to the quadruped 402 with respect to the position of detected obstacles. As an example and not a limitation, the quadruped 402 can be trained that vibration on the left torso means move left, and vibration on the right torso means move right. In other exemplary embodiments, the quadruped 402 can be trained with other vibration patterns to mean other things as may be required and/or desired in a particular embodiment.

In an exemplary embodiment, user 302 can use the mobile software application to send digitized commands to the navigational control system 600 that controls the administering of the stimulation signals 706/716 to the vibrators 622 so that user 302 can walk with and control the quadruped 402 walking path and motion by way of the mobile software application. In this regard, memory 616 is encoded with instructions that when executed by the microcontroller 602 perform the steps of receiving at least one digitized command by way of the communication interface 612 from the remote data processing resource 806 or the computing device 802. And based on the digitized command received, administer or otherwise apply the stimulation signal 706/716 to appropriate one or more vibrators 622 on the left side, right side, or chest side of the quadruped 402, wherein the digitized commands are used to direct the motion of the quadruped 402.

Turning now to the drawings in greater detail, it will be seen that in FIG. 1 there is illustrated one example of a navigational safety system for visually impaired quadrupeds 402. In an exemplary embodiment, an onlay 104 can comprise a saddle portion 104A designed to bridge the front shoulders across the back of the quadruped 402, a chest portion designed to be positioned on the chest of the quadruped 402, and a connecting portion 104B that descends from at least one shoulder and along the neckline to the chest area. In reference 'A', the onlay 104 is flexible and contoured in shape to bridge 104A across the top of the front shoulders of the quadruped 402 forming a left side 110A and a right side 110B and descends 104B from at least one shoulder and along the neckline to the chest 104C area of the quadruped 402 forming the chest side 110C.

The onlay 104 has a right side 110B, a left side 110A, a top side 110D, a bottom side 110E, and a chest side 110C. In reference 'B', the onlay 104 is retrofittable to the harness 206 worn by a quadruped 402. In this regard, the bottom side of the onlay 104 is removably secured to the harness 206 such that the left side 110A is on the left side of the quadruped 402 torso, the right side 110B is on the right side of the quadruped 402 torso, and the chest side 110C is on the chest of the quadruped 402 torso.

More than one distance sensor 620A-620F is operationally related to a microcontroller 602 and configured to determine the distance between the distance sensor 620A-F and an object 508. At least one of the distance sensors 620A-F is located on each of the left side 110A and the right side 110B of the saddle portion 104A, and the chest side 110C.

In operation, more than one of the vibrator 622 is configured to vibrate when energized with a stimulation signal 706/716. The vibrator 622 is operationally related to the microcontroller 602 and configured to provide localized vibration stimulation proximate the vibrator 622 to the quadruped 402 as a means to inform the quadruped 402 of an object 508/518 they are to move away from or a perimeter boundary 512 to remain within. At least one vibrator 622 is located on each of the left side 110A and the right side 110B of the saddle portion 104A, and the chest portion 104C.

Distance sensors 620A-B are located on both the right side 110B and left side 110A of the saddle portion 104A similarly. Additionally, distance sensors 620A-B and vibrator 622 stimulators can be packaged together and co-located in a saddle 104A pocket 106. Pocket 106 can be water-resistant when closed. Pocket 106 allows the distance sensors 620A-B and vibrator 622 stimulators to be removed from the saddle when necessary. Furthermore, enclosure 102 can be fastened to or inserted into the saddle portion 104A. Enclosure 102 can house the navigational safety control system 600. The enclosure 102 preferably is watertight when closed allowing wire harnesses that attach the various distance sensors 620A-F, vibrators 622, and other electronics to interconnect with the navigational safety control system 600 in a secure and water-resistant manner.

A memory 616 is operationally related to the microcontroller 602. The memory 616 is encoded with instructions that when executed by the microcontroller 602 perform the steps of administering or otherwise applying the stimulation signal 706/716 to the one or more vibrators 622 in a first side position on the right side 110B or the left side 110A depending on preset preferences in the navigational control system 600 when the distance sensor on the right side 110B detects the object 508. Administering or otherwise applying the stimulation signal 706/716 to the one or more vibrators 622 in a second side position, the second side position is on the right side 110B or the left side 110A opposite the first side position when the distance sensor 620A-B is positioned on the left side 110A detects the object 508. And administering or otherwise applying the stimulation signal 706/716 to the one or more vibrators 622 positioned on the chest side 110C when the distance sensor 620C-F positioned on the chest side 110C detects the object 508A-D and the pathways to the right or the left of the object are blocked (better illustrated in at least FIGS. 2 and 4). In this regard, the quadruped 402 that is visually impaired is alerted through localized vibration stimulation on various areas of the quadruped's body to the relative position of the object prior to inadvertently walking into the object. For disclosure purposes, object 508, GPS defined virtual object 518, and GPS defined perimeter 512 can all be referred to as an object or an obstacle.

In the present invention, such administering or otherwise applying the stimulation can be limited to when the navigational control system 600 is in an active mode of operation and the quadruped 402 is standing and/or in motion.

In an exemplary embodiment, in reference 'B', the harness 206 can be constructed as a single continuous piece of material with a neck hole 222. In operation, the quadruped's 402 head and neck are inserted through neck hole 222 and the lower flaps 212 and 214 are pulled up around the bottom of the quadruped's 402 torso proximate the quadruped's front legs, around the ribcage, buckled to the upper flaps 216, and fastened by way of buckle 210. The attachment is done the same way on the right side. The length of the buckle straps 220 is adjustable so that the harness 206 forms a secure fit on the quadruped 402. The harness 206 can be equipped with a durable fabric pull-strap 202 and a durable tether ring 204.

In an exemplary embodiment, enclosure 102 which houses the navigational safety control system 600 can have an accessible compartment within enclosure 102 in which a removable power source 604 such as batteries can be changed and/or a rechargeable power source 604 such as rechargeable batteries can be recharged.

In an exemplary embodiment, a system of distance sensors 620 protrude from the outer surface of the onlay 104 in several locations to detect various obstacles 508 to the left, right, and in front of the quadruped 402 simultaneously. The harness 206 comprises two or more layers of synthetic fiber woven fabric 218 that surrounds a thin layer of breathable padding material and is surrounded and sealed by a sewn border lining 208. The navigational safety control system 600 is housed within a waterproof enclosure 102 that is affixed to the onlay 104. Alternatively, the navigational safety control system 600 can be fitted securely between the two layers of fabric 218 with the distance sensors 620A-F and the power source 604 exposed and protruding through cutouts in the outer layer of harness fabric 218.

In an exemplary embodiment, in reference 'C', the quadruped is illustrated wearing the harness/onlay 104/206 combination. The onlay 104 is flexible and contoured in shape to bridge across the top of the front shoulders of the quadruped 402 forming the left side 110A and right side 110B and descends from at least one shoulder and along the neckline to the chest of the quadruped 402 forming the chest side 110C. Operating independently, the distance sensors 620 and stimulating vibrators 622 are packaged together and installed on the left side 110A to detect 304 the distance between an object 508 and the distance sensors 620, and the right side 110B to detect 302 the distance between an object and the distance sensors 620.

A chest sensor cluster is formed from more than one of the distance sensors 620C-620F. The chest sensor cluster orientates 306C at least one of the distance sensors 620E in a horizontal pointing alignment when the quadruped 402 is standing. At least one of the distance sensors 620F is orientated 306D in a ground pointing alignment when the quadruped 402 is standing. The distance sensor in the ground pointing alignment can continuously measure the distance between the distance sensor 620F and the ground, as better illustrated in FIGS. 2-3, to determine an average distance measurement 306C with reference to the ground. If the average distance measurement 306C decreases it indicates an inclining ground surface object 508, such as stairs going up. If the average distance measurement 306C increases it indicates a declining ground surface object 508, such as stairs going down.

Alternatively, at least one of the distance sensors 620C or 620D is orientated 306A or 306B respectively in an elevated pointing alignment when the quadruped 402 is standing.

Alternatively, at least one of the distance sensors 620C can be aligned elevated and pointing left to detect 306A objects 508 or voids that are in front of the quadruped 402, and at least one of the distance sensors 620D can be aligned elevated and pointing right to detect 306B objects 508 of voids that are in front of the quadruped 403.

In the present invention, the term "void" is intended to mean either no detected object 508 or a detected object that is distant enough from the quadruped 402 as to pose no immediate threat of the quadruped 402 walking into the object. In this regard, as an example and not a limitation, while a front horizontal distance sensor 620E may detect an object, the elevated right distance sensor 620C may detect a void. In this case, the quadruped can be stimulated on the left side by the appropriate vibrator 622 to turn towards the detected void on the right side missing the detected object in front of the quadruped 402. In a plurality of exemplary embodiment, the distance sensors 620 operate to detect objects and voids and as appropriate energize the appropriate vibrators 622 are energized with stimulation signals 706/716 to cause the quadruped to move left, right, detect inclining surfaces, detect declining surface, or stop to avoid obstacles.

Figure 2:
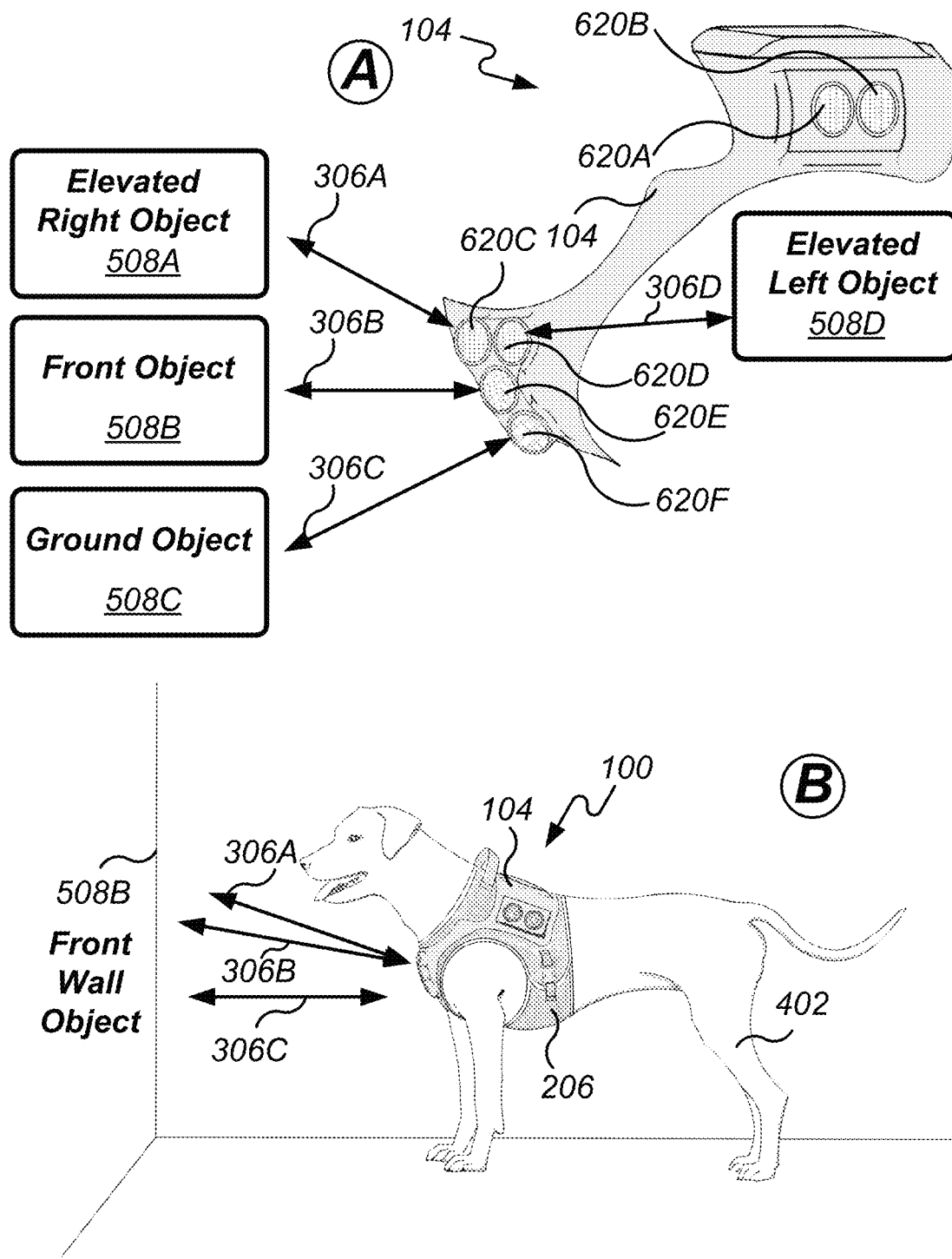
FIG. 2 illustrates one example of a navigational safety system forward aligned distance sensors and wall detection.

Referring to FIG. 2, there is illustrated one example of a navigational safety system 600 forward aligned 306B of the distance sensors 620C and wall detection 506. In an exemplary embodiment of frontal object detection, the stimulation signal 706/716 is provided to one or more of the vibrators 622 which is felt by the quadruped 402 in a localized area on the quadruped's torso 402 on either the left side 110A, the right side 110B, or the chest side 110C causing the quadruped 402 to turn left, right, slow for stairs, or stop to avoid and/or navigate around objects 508A-D.

In operation, in reference 'A', a chest sensor cluster located on the chest side 110C is formed from more than one of the distance sensors 620C-F. The chest sensor cluster orientates at least one of the distance sensors 620E in the horizontal 306B pointing alignment when the quadruped 402 is standing.

Additionally, at least one of the distance sensors 620F is orientated in a ground pointing alignment when the quadruped 402 is standing. The distance sensor in the ground pointing alignment can continuously measure the distance between the distance sensor 620F and the ground, as better illustrated in FIGS. 2-3, to determine an average distance measurement 306C with reference to the ground. If the average distance measurement 306C decreases it indicates an inclining ground surface object 508, such as stairs going up. If the average distance measurement 306C increases it indicates a declining ground surface object 508, such as stairs going down.

In another exemplary embodiment, at least one of the distance sensors 620C or 620D is orientated in an elevated left 306D or elevated right 306A respectively pointing alignment when the quadruped 402 is standing.

In an exemplary embodiment of frontal object detection when standing and in motion as illustrated in reference each of the distance sensors 620C-F is sampled. When the distance sensor 620C, in a horizontal pointing alignment, detects an object 508B such as a wall or other object the left elevated 620D, right 620C, and ground 620F distance sensors are checked for objects or voids and appropriate stimulations and/or audio commands are determined and administered causing the quadruped 402 to change direction navigating around obstacles or preparing for inclining or declining surfaces.

In wall dead-end detection, if the horizontal distance sensor 620E detects 306B an object 508B, the ground distance sensor 620F detects 306C an object (typically the ground), and the right 620C and the left 620D both detect 306A and 306D respectively an object 508A and 508D respectively, the stimulation signal 706/716 is applied to the vibrator 622 proximate the chest area 110C which administers or otherwise applies vibration to the quadruped's 402 torso chest area indicating a dead-end path, stop and turn.

In front left object detection, if the horizontal distance sensor 620E detects 306B an object 508B, the ground distance sensor 620F detects 306C an object 508C (typically the ground), the right distance sensor 620C detects 306A a void (or far off object), and the left distance sensor 620D detects 306D an object 508D, the stimulation signal 706/716 is applied to the vibrator 622 proximate the left side area 110A which administers or otherwise applies vibration to the quadruped's 402 torso on the left side indicating turn right away from the object.

In front right object detection, if the horizontal distance sensor 620E detects 306B an object 508B, the ground distance sensor 620F detects 306C an object (typically the ground), the right distance sensor 620C detects 306D an object 508A, and the left distance sensor 620D detects a void (or far off object), the stimulation signal 706/716 is applied to the vibrator 622 proximate the right side area 110B which administers or otherwise applies vibration to the quadruped's 402 torso on the right side indicating turn left away from the object.

Figure 3:
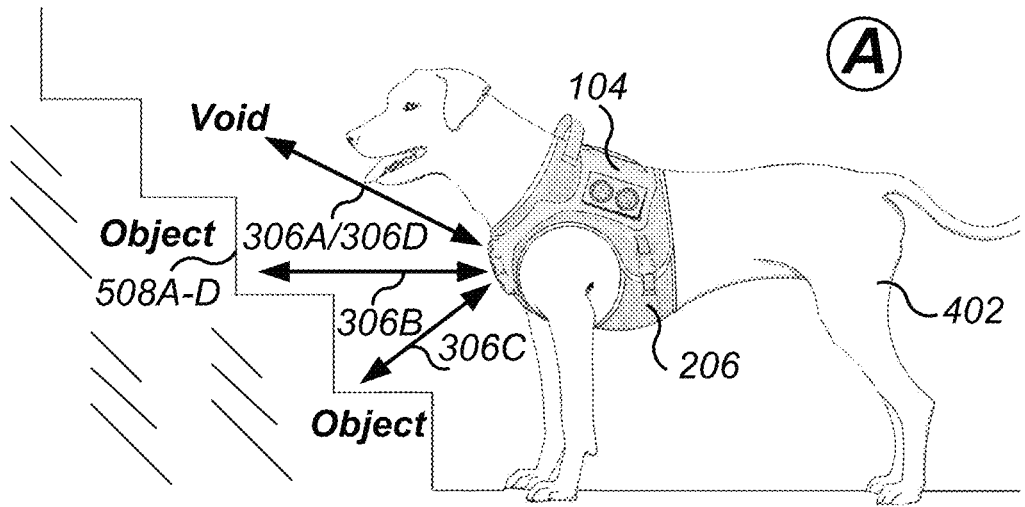
FIG. 3 illustrates one example of a navigational safety system forward aligned distance sensors being used for inclining and declining surface detection.
Figure 3:
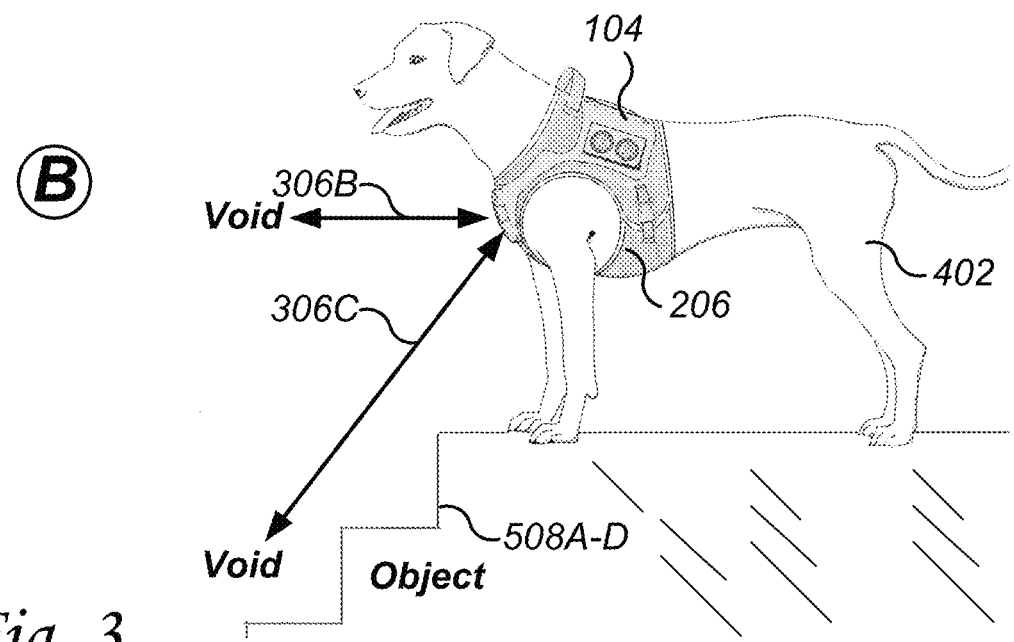

Referring to FIG. 3, with reference to FIG. 2, there is illustrated one example of a navigational safety system 104 forward aligned distance sensors 620C-F being used for inclining and declining surface detection. In an exemplary embodiment, in reference 'A', in front incline object 508A-D detection, if the horizontal distance sensor 620E detects 306B an object 508B, and the ground distance sensor 620F detects 306C an object (typically the ground). The distance sensor in the ground pointing alignment can continuously measure the distance between the distance sensor 620F and the ground to determine an average distance measurement 306C with reference to the ground. If the average distance measurement 306C decreases it indicates an inclining ground surface object 508, such as stairs going up. If the average distance measurement 306C increases it indicates a declining ground surface object 508, such as stairs going down.

In another exemplary embodiment, either the right distance sensor 620C detects 306A an object 508A or the left distance sensor 620D detects 306D an object 508D, and it is determined that the distance to the right object 508A and/or the left object 508D is greater than the distance to the front object 508B, an inclining surface is detected and the stimulation signal 706/716 is applied to the vibrator 622 proximate the chest area 110C which administers or otherwise applies vibration to the quadruped's 402 torso in the chest area indicating stop or pause. In addition, an audio command such as "stairs", "up", or other commands is played through speaker 610 that the quadruped 402 can hear causing the quadruped to proceed up the inclining surface.

In reference 'B', in front decline object 508A-D detection, if the horizontal distance sensor 620E detects a void (or far off object), and the ground distance sensor 620F detects 306C a void (or far off object) or the average distance measurement 306C increases, a declining surface is detected and the stimulation signal 706/716 is applied to the vibrator 622 proximate the chest area 110C which administers or otherwise applies vibration to the quadruped's 402 torso in the chest area indicating stop or pause. In addition, an audio command such as "step down", "slow", or other commands is played through speaker 610 that the quadruped 402 can hear causing the quadruped to proceed down the declining surface.

Figure 4:
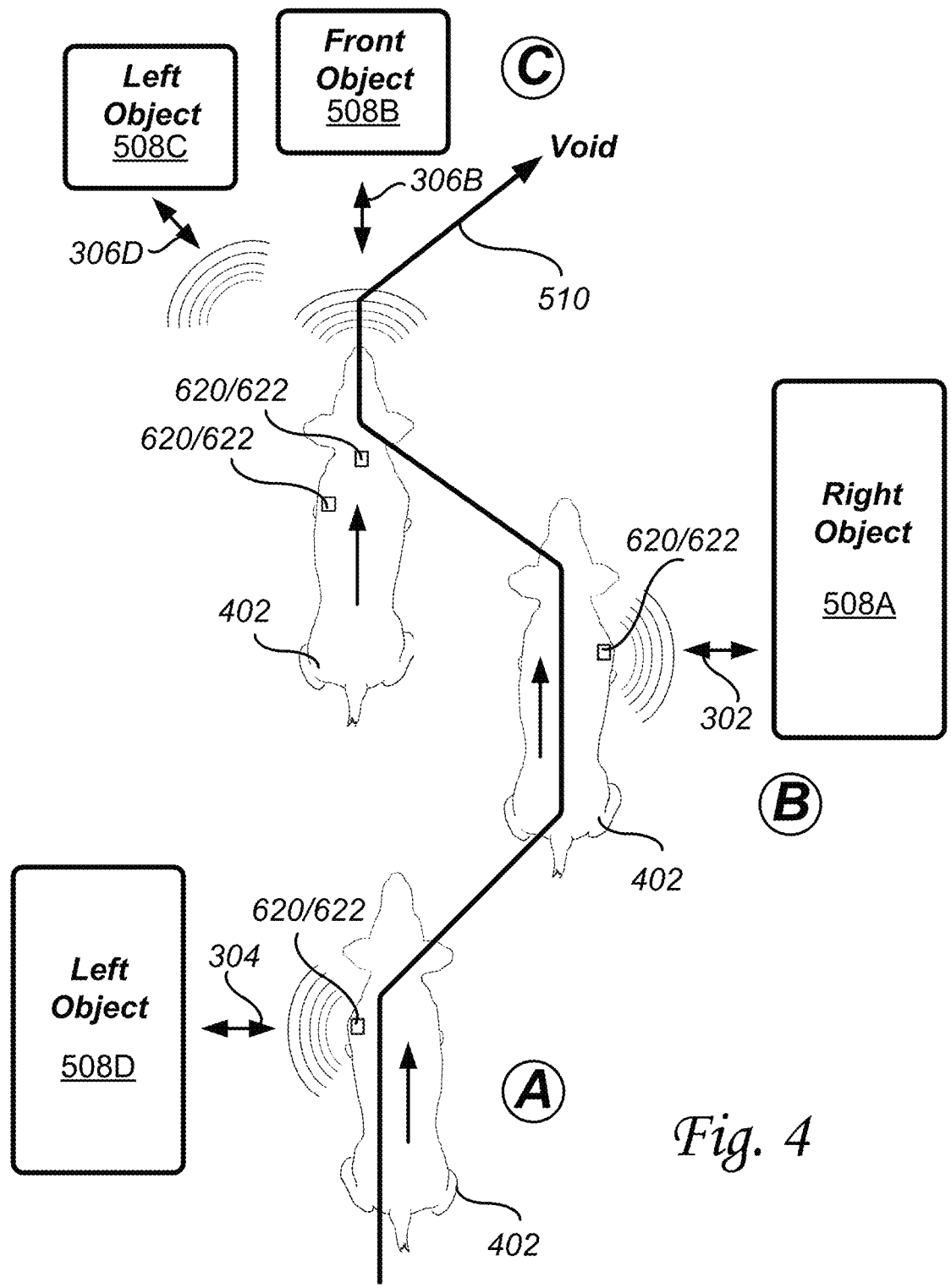
FIG. 4 illustrates one example of a navigational safety system distance sensor alignment for pathway object avoidance.

Referring to FIG. 4, there is illustrated one example of a navigational safety system distance sensor 620 aligned for pathway object 508A-C avoidance. In an exemplary embodiment, as an example and not a limitation of operation, an onlay 104 can be attached to a harness 206. The onlay 104 has a right side, a left side, a top side, a bottom side, and a chest side.

The harness 206 and the onlay 104 combination are secured to a quadruped 402. The bottom side of the onlay 104 can be removably secured to the harness 206 such that the left side 110A of the onlay 104 is on the left side of the quadruped 402 torso, the right side 110B of the onlay 104 is on the right side of the quadruped 402 torso, and the chest side 110C of the onlay is on the chest of the quadruped torso. More than one distance sensor 620 is operationally related to a microcontroller 602 and configured to determine the distance between the distance sensor 620 and an object 508A-D. At least one of the distance sensors is located on each of the left side 110A of the onlay 104, the right side 110B of the onlay 104, and the chest side 110C of the onlay. More than one vibrator 622 is configured to vibrate when energized with a stimulation signal 706/716. The vibrator 622 is operationally related to the microcontroller 602 and configured to provide localized vibration stimulation proximate the vibrator 622 to the quadruped 402. At least one of the vibrators 622 is located on each of the left side 110A, the right side 110B, and the chest side 110C.

In operation, the quadruped 402 is walking along pathway 510. Starting in reference 'A', as the quadruped 402 approaches the left object 508D, the stimulation signal 706/716 is administered to the vibrator 622 that is positioned on the left side 110A of the quadruped 402 torso when the distance sensor 622 on the left side 110A detects 304 the object 508D causing a localized vibration to be delivered to the left side torso of the quadruped 402. In response to the vibration stimulation, the trained quadruped 402 will change course away from the left object 508D without bumping into the left object 508D.

Continuing, in reference 'B', as the quadruped 402 approaches the right object 508A, the stimulation signal 706/716 is administered to the vibrator 622 that is positioned on the right side 110B of the quadruped 402 torso when the distance sensor 622 on the right side 110B detects 302 the object 508A causing a localized vibration to be delivered to the right side torso of the quadruped 402. In response to the vibration stimulation, the trained quadruped 402 will change course away from the right object 508A without bumping into the right object 508A.

Continuing, in reference 'C', as the quadruped 402 approaches the front object 508B, the stimulation signal 706/716 is administered to the vibrator 622 that is positioned on the chest side 110C of the quadruped 402 torso when the distance sensor 622 on the chest side 110C detects 306B the object 508B causing a localized vibration to be delivered to the chest side 110C torso of the quadruped 402 when the pathways to the right and the left of the object 508 are blocked. In response to the vibration stimulation, the trained quadruped 402 will change course away from the front object 508A without bumping into the front object 508A. In this example, a left object 508C is also detected 306D causing a localized vibration to be delivered to the left side 110A torso instead of the chest side 110C of the quadruped 402 causing the quadruped 402 to turn right towards the void, avoiding the obstacle 508. The trained quadruped will then know to turn right away from both the left object 508C and front object 508B.

In another exemplary embodiment, if the void was on the left side and the front and right pathways were blocked then a localized vibration would be delivered to the right side 110B torso of the quadruped 402 and the trained quadruped would know to turn left away from both the right object and front object.

In another exemplary embodiment, if the front, right, and left pathways were blocked then a localized vibration would be delivered to the chest side 110C torso of the quadruped 402, and the trained quadruped would know the pathway was blocked and they need to turn around.

Figure 5:
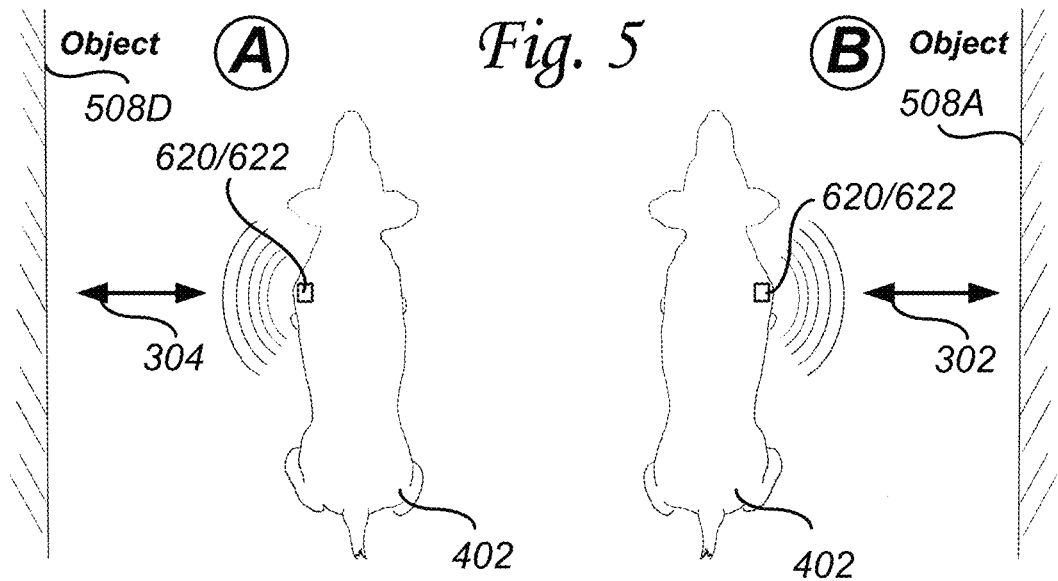
FIG. 5 illustrates examples of stimulation signals.
Figure 5:
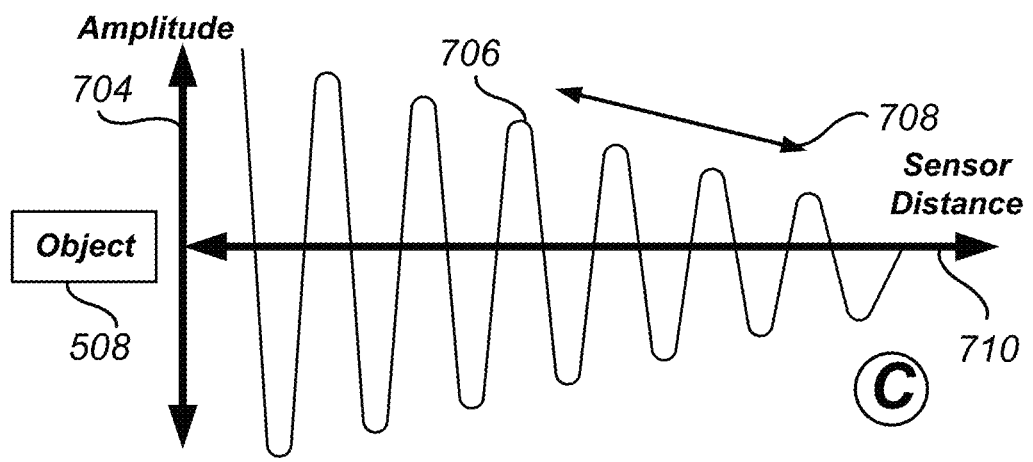
Figure 5:
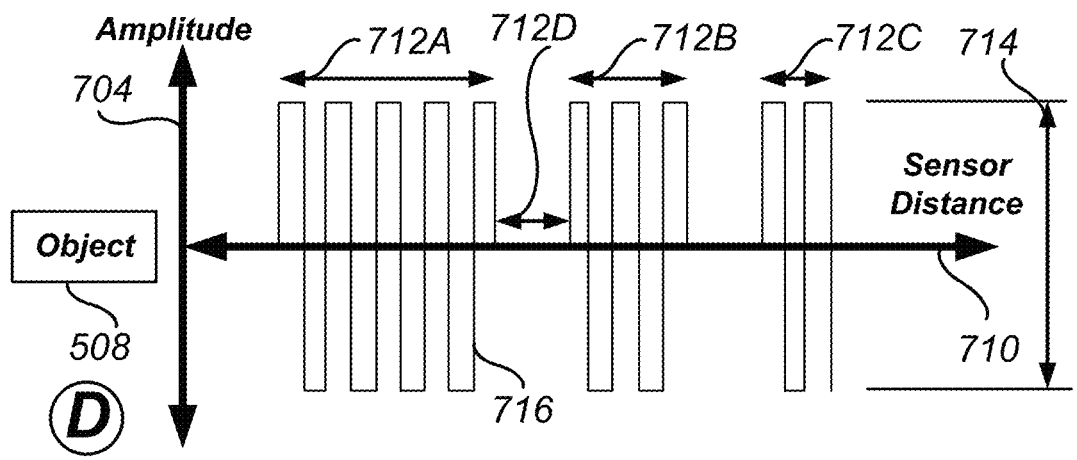

Referring to FIG. 5, there is illustrated one example of stimulation signals 706 and 716. In an exemplary embodiment, in reference 'A' a distance sensor 620 and vibrator 622 combination can be co-located on the left side 110A of the quadruped 402 such that when an object 508D is detected 304 the localized vibration can be delivered by the vibrator 622 to the quadruped's 402 left side 110A. Additionally, in reference 'B' a combination distance sensor 620 and vibrator 622 can be co-located on the right side 110B of the quadruped 402 such that when an object 508A is detected 302 the localized vibration can be delivered by the vibrator 622 to the quadruped's 402 right side 110A.

In an exemplary embodiment, the stimulation signal 706 or the square wave 716 is electrically coupled to the vibrator 622 causing the vibrator 622 to activate. In this regard, in a first exemplary embodiment, when the sine wave 706 illustrated in reference 'C' is used, either in an electrical voltage changing amplitude mode of operation or an electrical current changing mode of operation, the amplitude 704 of the sine wave 706 can be increased the closer distance 710 the object 508 is to sensor 620. In operation, the quadruped 402 will feel a slight vibration initially at a farther distance 710 from the object 508 and as the quadruped 402 continues to approach the object 508 at a closer distance 710 the amplitude 704 of the sine wave 706 will increase, increasing the intensity of the vibrations delivered to the quadruped 402. When the quadruped 402 moves away from the object the vibration will stop. The amplitude 704 range can be preset by the user 302 as required and/or desired in a particular embodiment for the correct operation of vibrators 622 and safety of the quadruped 402. In this regard, the stimulation signal is a frequency wave that increases in at least amplitude as the distance between the distance sensor and the object decreases.

In a second exemplary embodiment, when the square wave 716 illustrated in reference 'D' is used, the amount of square wave 716 pulses 712A-C in the pulse train can be increased the closer distance 710 the object 508 is to the sensor 620. In operation, the quadruped 402 will feel a short duration vibration initially at a farther distance 710 from the object 508 and as the quadruped 402 continues to approach the object 508 at a closer distance 710 will increase from the vibration duration from 712C a short pulse train to 712B a longer pulse train to 712C an even longer pulse train. After a pulse train has been delivered to the quadruped 402. When the quadruped 402 moves away from the object the vibration will stop. User 302, can adjust and preset the amplitude 714 and pulse train 712A-C characteristics as required and/or desired in a particular embodiment for the correct operation of the vibrators 622 and the safety and effectiveness of the vibration delivery to and trained interpretation by the quadruped 402. In this regard, the stimulation signal is a pulse train at a constant amplitude, the pulse train increases in duration as the distance between the distance sensor and the object decreases.

In a third exemplary embodiment, when the square wave 716 illustrated in reference 'D' is used, the amount of square wave 716 pulses 712A or sine waves in the pulse train packet can remain the same but the time period 712D between pulse train packets can vary. In this regard, as an example and not a limitation, the time period 712D between the pulse train packets can decrease causing pulse train 712A to occur more frequently as the distance between the distance sensor 620 and the object 508 decreases. And the time period 712D between the pulse train packets can be increased causing pulse train 712A to occur less frequently as the distance between the distance sensor 620 and the object 508 increases.

In a plurality of other exemplary embodiments, other types and kinds of stimulation signals can be generated and utilized to create and control the vibration characteristics and the safety and effectiveness of the vibrations delivered and trained interpretation by the quadruped 402 as may be required and/or desired in a particular embodiment. In addition, vibrators 622 can be motorized, solenoid actuated, electromagnet, or other types or kinds of vibrators as may be required and/or desired in a particular embodiment.

Figure 6:
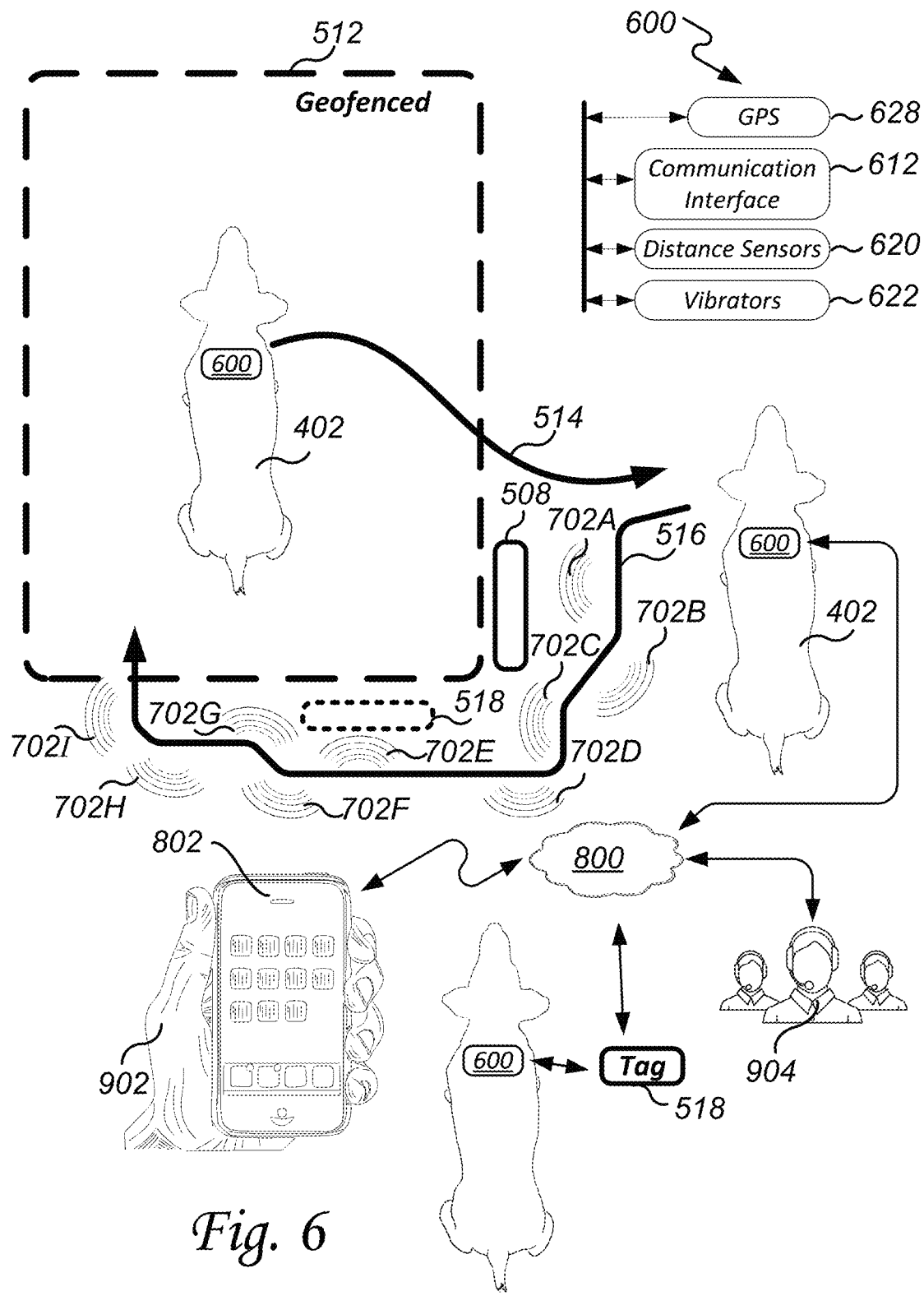
FIG. 6 illustrates examples of geofencing of a perimeter, geofenced obstacles, and geofenced virtual obstacles applications.

Referring to FIG. 6, there are illustrated examples of geofencing of a perimeter 512, geofenced obstacles 508, and geofenced virtual obstacles 518 applications. In an exemplary embodiment, the navigational control system 600 that is fastened to the onlay 104 that in turn is fastened to the harness 206 which is worn by the quadruped 402 comprises the microcontroller 602, a global position system (GPS) 628 for receiving GPS satellite data communications, and a communication interface 612 for data communicating wirelessly locally and/or over a global network 800 such as the Internet with computing devices 802, remote data processing resources 806, and remote customer service agents 804 who can remotely monitor and control by way of data communications many aspects of the navigational control system 600, the onlay 104, and the quadruped 402 through stimulation vibrations walking pathway while in motion. The GPS 628 and communication interface 612 are operationally related to the microcontroller 602. The communication interface 612 can data communicate within a local area network environment and/or a wide area network environment using wireless protocols such as Bluetooth, Wifi 802.11abgn, 3G, 4G, 5G, LORAN, and other wireless protocols as may be required and/or desired in a particular embodiment.

In an exemplary embodiment, in operation, the GPS coordinates of a geo-fence perimeter 512 can be determined and stored in memory 616 on the navigation control system 600 and/or stored remotely by way of remote data processing resource 806 in a database 808. The database 808 is operationally related to the remote data processing resource 806. Similarly, geofencing obstacles 508 such as physical obstacles like outdoor barbeques, patio furniture, and other physical obstacles that may or may not always reliably trigger in-proximity distance sensor 620 alerts. Such physical objects can be geofenced and stored in memory 616 on the navigation control system 600 and/or stored remotely in a database 808. Additionally, in a similar manner, geofencing virtual obstacles 508 that would not trigger an in-proximity distance sensor 620 alerts such as pools, barbeque pits, and other virtual obstacles can be geofenced and stored in memory 616 on the navigational control system 600 and/or stored remotely by way of a remote data processing resource in a database 808.

In a plurality of exemplary embodiment, geofenced objects 508 and geofenced virtual objects 518 can be identified, and mapped inside or outside the geofenced perimeter 512 as may be required and/or desired in a particular embodiment.

Once the GPS coordinates of one or more of the geofenced perimeter 512, geofenced obstacle 508, and/or geofenced virtual objects 518 are determined, mapped, and stored memory 616, and/or remote database 808, the quadruped 402 can walk around inside the geofenced perimeter 512. Should the quadruped 402 cross 514 a perimeter boundary 512, stimulation signals 706/716 can be administered, to the quadruped 402, by way of the appropriate vibrators 622 to plot a return course 516 to the inside of the geofenced perimeter 512, including avoiding un-geofenced and geofenced obstacles 508, and geofenced virtual obstacles 518. In this regard, such plotting of a return course 516 and the stimulation signals 706/716 that activate the various vibrators 622 can be determined and administered using the current GPS location of the quadruped 402 determined by the GPS 628 and the previously mapped and stored geolocation data in memory 616, and/or remotely stored in database 808.

In applications where the mapped and stored geolocation data is stored on the remote database 808, the GPS 628 can determine the current GPS location of the quadruped 402 and data communicate the GPS location to the remote data processing resource 806 by way of the communication interface 612. The remote data processing resource 806 is operationally related to the database 808 and can determine based on the received GPS data and the previously stored GPS obstacle and perimeter data how the quadruped 402 should be stimulated with vibration to follow a return path 516 to within the geofenced perimeter 512.

As an example and not a limitation, the quadruped 402 having breached the geofenced perimeter 512 triggers an alert. Alerts can be data communicated to the user 302 computing device 802 and remote customer service agents 904 as may be required and or desired in a particular embodiment.

A return path 516 can be determined either locally by the navigation control system 600 or remotely by the remote data processing resource 806. In embodiments that require and/or desire the use of customer service agents 904, they can detect the perimeter 512 breaches receiving an alert, monitor the GPS location of the quadruped 402, determine the return path 516, and control the motion of the quadruped 402 along a return path 516.

Whether the return path 516 is determined and managed by the navigational control system 600, remotely by the data processing resource, or remotely by way of the customer service agents 904 the quadruped 402 is returned to the geofenced perimeter 512 area along the return path 516 by avoiding physical 508 and virtual obstacles 518, and the administration or otherwise the application of stimulation vibrations even when there are no obstacles to keep the quadruped 402 on the return path 516. As an example, when on the return path 516 a physical obstacle 508 is detected 702A by the distance sensors 620 the quadruped 402 can be stimulated to avoid the obstacle 508. When a virtual obstacle 518 is detected 702E by the GPS location of the quadruped 402 and the stored geofenced virtual obstacle 517 data the quadruped 402 can be stimulated to avoid the virtual obstacle 518. When it is detected 702B-D, 702F-I that the quadruped 402 is straying from the return path 516, the quadruped 402 can be stimulated with vibrations to change course and stay on the return path 516.

In an exemplary embodiment, a plurality of tags 518 can be distributed where the quadruped 402 roams. Such distributed tags can indicate and/or record the movement of the quadruped 402 throughout the area the quadruped roams. In this regard, such tags 518 can be placed by food dishes, water bowls, by the quadruped's bed, by stairs, by the front door and other doors, and in other places as may be required and/or desired in a particular embodiment. In operation, when the quadruped 402 approaches one of the distributed tags 518 the navigational control system 600 detects the presence of the tag and can record and/or data communications alerts to the user 302 computing device 802 or a remote data processing resource 806 that is accessible by way of the user 302 computing device 802. In this regard, user 302 can monitor the roaming nature of the quadruped 402 when not present by recording and/or receiving alerts as to which tags and how often the quadruped 402 walked past.

The tags 518 can be RFID, Bluetooth, beacon, or other technology that is readable wireless when in the proximity of the navigational control system 600. The tags 518 can be configured to data communicate with the navigational control system and/or be configured to data communicate over the global network 800 as may be required and/or desired in a particular embodiment.

Figure 7:
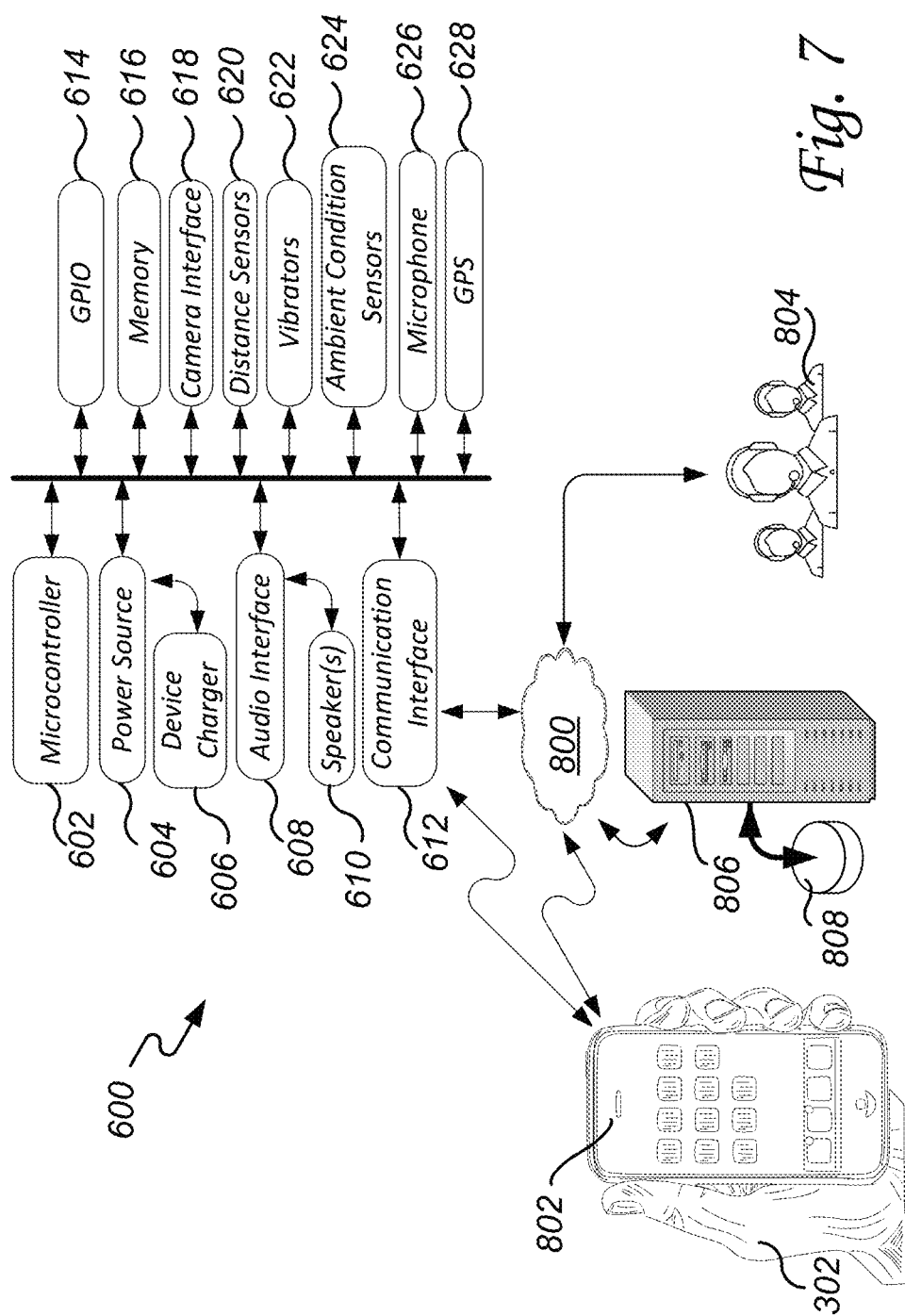
FIG. 7 illustrates one example of a navigational safety control system.

Referring to FIG. 7, there is illustrated one example of a navigational safety control system 600. In an exemplary embodiment, the navigational control system 600 can be fastened in enclosure 102 or secured between fabric layers of the onlay 104 or harness 206. At least one wire interconnects distributed distance sensors 620, vibrators 622, and other components as may be required and/or desired in a particular embodiment.

The term "web-enabled" or "web-enabled control system" or "web-enabled navigational control system 600" in the present invention is intended to mean an Internet-of-things device. In this regard, a device that is capable of connecting a physical device such as an onlay 104 equipped with the web-enabled navigational control system 600 and attached to a harness 206 that is worn by a quadruped 402 to the digital world. Stated differently, web-enabling is equipping a device with the necessary electronics to be monitored, controlled, and data communicate locally and remotely with other data communicating devices. Such other data communicating devices can be computing devices such as smartphones, tablets, laptops, and other web-enabled devices, servers, and similar devices as well as remote data processing devices, such as servers, databases, and other remote data processing devices. Data communicating devices include a computing device 802 and remote data processing resource 806, as well as database 808 that is operationally related to the remote data processing resource 806.

In addition, such navigational control system 600 can data communicate with remote data processing resources 806 and utilize data storage resources 808. Such remote data processing resources 806 can be servers or other types and kinds of data processing resources. Furthermore, navigational control system 600, computing device 802, remote data processing resources 806, data storage resources 808, and other types and kinds of data communicating devices can data communicate over a global network 800. The global network 800 can be the Internet.

In an exemplary embodiment, the onlay 104 can be equipped with a web-enabled navigational control system 600. Such a web-enabled control system 600 can comprise a microcontroller 602 which is operationally related to a plurality of communication interfaces 612, power supply 604 with optional device charger 606, vibrators 622, distance sensors 620, general-purpose inputs and outputs (GPIO) interface 614, memory 616, camera interface 618, ambient condition sensors 624, a microphone 626, an audio interface 608 with operationally related speaker(s) 610, and global position system 628.

The microcontroller 602 can be INTEL, ZILOG, MICROCHIP, AMD, ARM, and/or other types or kinds of microcontrollers.

The communication interfaces 612 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

In an exemplary embodiment, a communication interface 612 is operationally related to the microcontroller 602 and configured to data communicate with one or more of a computing device 802 or one or more of a remote data processing resource 806.

The power supply 604 can be AC, DC, battery, solar, and/or other types and kinds of power supplies. The device charger can be operationally related to the power source 606 and be used to receive external power, convert, meter, and otherwise administer it to the power source 604 as a way of recharging the power source. The device charger 606 can be an external transform that is removably connected to the power source 604 to recharge and then is removed.

The GPIO 612 can be TTL, CMOS, MOSFET, transistors, buffers, relays, pushbutton, switch, and/or other types and kinds of GPIO circuits. In an exemplary embodiment, some of the GPIO 612 lines can be used to drive a display that can comprise an LCD, OLED, LED, and/or other types and kinds of displays. In another exemplary embodiment, some of the GPIO 612 lines can be used to drive an alarm to alert people proximate the quadruped 402. The alarm can be noise, lights, relays, siren, horn, piezo buzzer, speaker, voice annunciations, and/or other types and kinds of alarms.

The memory 616 can be combinations of RAM, ROM, flash, hard drives, solid-state drives, USB flash drives, micro SD cards, and/or other types and kinds of memory.

The camera interface 618 can integrate one or more cameras into the onlay 104 so that the area around the quadruped can be remotely monitored or otherwise observed.

The distance sensors 620 can be a combination of PIR motion sensors, infrared, thermal, Doppler radar, ultrasonic, optical such as camera image processing, capacitance, touch-type, optical, Hall effect, switch, and/or other types and kinds of distance sensors as may be required and/or desired in a particular embodiment.

The vibrators 622 can be motorized, solenoid actuated, electromagnet, or other types or kinds of vibrators as may be required and/or desired in a particular embodiment.

The ambient condition sensors 624 can be temperature, moisture, humidity, sunlight, time, date, and/or other types and kinds of ambient condition sensors.

The global position system (GPS) device 628 can be used to determine the geographic location of the quadruped 402.

In an exemplary embodiment, a global position system (GPS) 628 is operationally related to the microcontroller 602. The GPS 628 generates data related to the geolocation of the quadruped 402 while wearing the onlay 104. Memory 616 is encoded with instructions that when executed by the microcontroller 602 perform the steps of receiving geofenced boundary data associated with a geofenced perimeter 512 that the quadruped 402 is to remain within or geofenced obstacle avoidance data associated with a geofenced obstacle the quadruped 402 is to avoid from a remote data processing resource 806 or the computing device 802 by way of the communication interface 612. The geolocation of the quadruped is then determined by way of the GPS, and the stimulation signal is administered or otherwise applied to the appropriate one or more of the vibrators 622 on the left side, right side, or chest side causing the quadruped 402 to avoid the geofenced obstacles or remain within the geofenced perimeter 512.

In another exemplary embodiment, when the quadruped 402 is outside of the geofenced perimeter the stimulation signal 706/716 is administered or otherwise applied to the appropriate one or more vibrators on the left side, right side, or chest side causing the quadruped 402 to return within the geofenced perimeter 512.

The microphone 626 can be a general-purpose microphone for listening to and/or recording audible noises in proximity to the quadruped 402 and/or data communicating the audio heard or recorded to the computing device 802 and/or the remote data processing resource 806 for record and/or playback.

An audio interface 608 can include the digital to analog converts, amplifiers, and other playback devices to playback received and stored audio commands, messages, and other audio as may be required and or desired in a particular embodiment. A speaker 610 for use in playing back audio can be operationally related to the audio interface 608.

In an exemplary embodiment, the audio interface 608 has interconnected at least one speaker 610. The audio interface 608 is operationally related to the microcontroller 602. Memory 616 is encoded with instructions that when executed by the microcontroller 602 perform the steps of receiving at least one digitized voice message by way of the communication interface 612 from the remote data processing resource 806 or the computing device 802. The voice message is saved in memory 616. One or more of the voice messages is selected to play in response to one or more of the distance sensors 620 detecting the object 508/518. And playing, by way of the speaker 610, the selected one or more voice messages in combination with administering or otherwise applying the stimulation signal 706/716 to the appropriate one or more vibrators 622.

In an exemplary embodiment, user 302 can use a computing device 802 to data communicate wirelessly voice messages to the navigational control system 600 that are played back in real-time by way of communication interface 612/audio interface and 608/speaker 610, so that user 302 can speak to the quadruped 402

Figure 8:
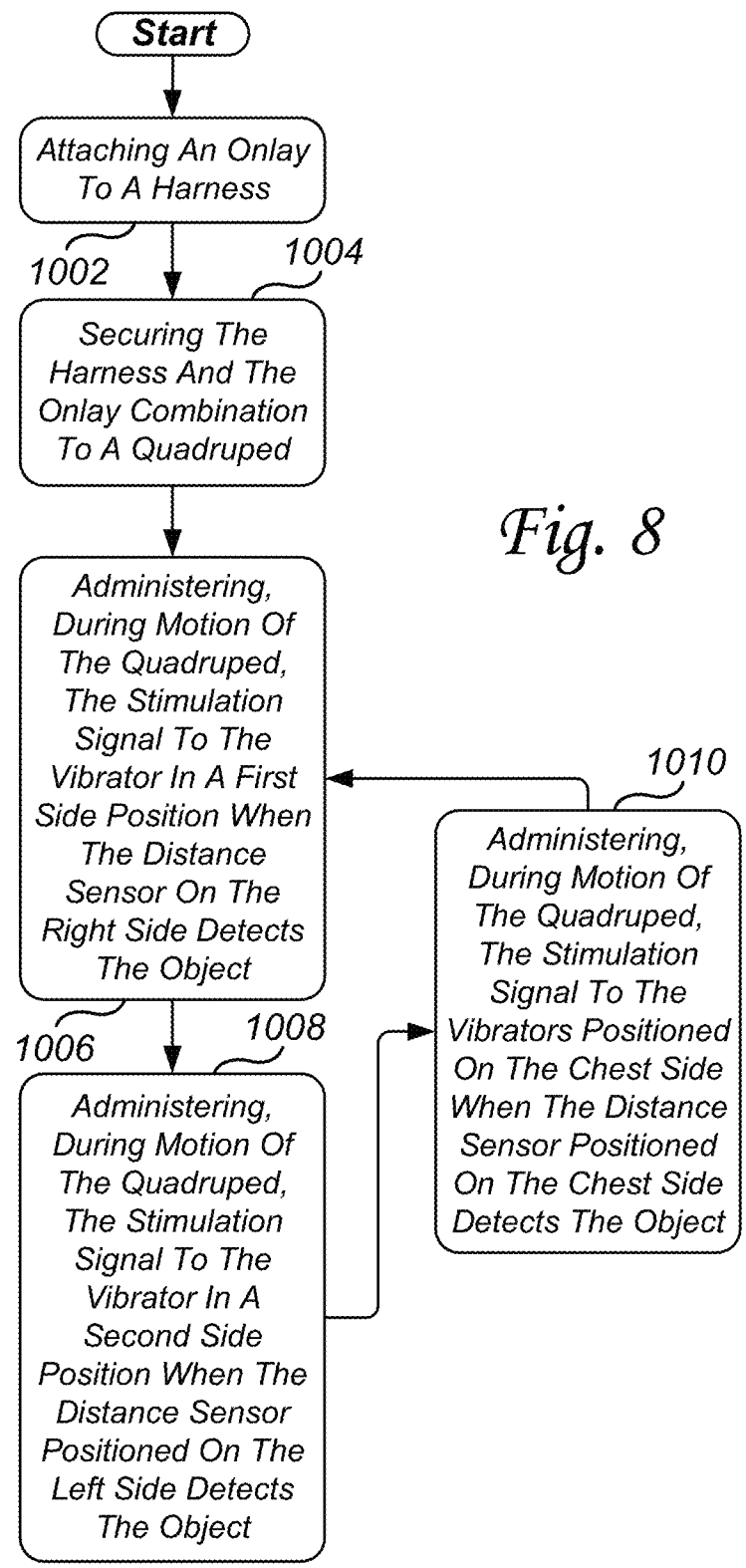
FIG. 8 illustrates one example of a navigational safety method for visually impaired quadruped.

Referring to FIG. 8, there is illustrated one example of a navigational safety method for a visually impaired quadruped. In an exemplary embodiment, the method starts in step 1002 by attaching an onlay 104 to a harness 206. The onlay 104 has a right side 110B, a left side 110A, a top side 110D, a bottom side 110E, and a chest side 110C. The method then moves to step 1004.

In step 1004, the harness 206 and the onlay 104 combination are secured or otherwise removably fastened together and placed on the quadruped 402. In this regard, the bottom side 110E of the onlay 104 is removably secured or otherwise fastened to the harness 206 such that the left side 110A is on the left side of the quadruped 402 torso, the right side 110B is on the right side of the quadruped 402 torso, and the chest side 110C is on the chest of the quadruped 402 torso. More than one distance sensor 620 is operationally related to a microcontroller and configured to determine the distance between the distance sensor 620 and an object 508. At least one of the distance sensors 620 is located on each of the left side 110A, the right side 110B, and the chest side 110C. More than one vibrator 622 is configured to vibrate when energized with a stimulation signal 706/716. The vibrator 622 is operationally related to the microcontroller 602 and configured to provide localized vibration stimulation proximate the vibrator 622 to the quadruped 402. At least one of the vibrator 622 is located on each of the left side 110A, the right side 110B, and the chest side 110C. The method then moves to step 1006.

In step 1006, administering or otherwise applying the stimulation signal 706/716 to the vibrator 622 in a first side position on the right side 110B or left side 110A depending on preset preference when the distance sensor 620 on the right side 110B detects the object 508. The method then moves to step 1008.

In step 1008, administering or otherwise applying the stimulation signal 706/716 to the vibrator 622 in a second side position on the left side 110A or the right side 110B opposite the first side position when the distance sensor 620 is positioned on the left side 110A detects the object 508.

With regards to step 1008, to train the quadruped 402, in an exemplary embodiment, in training the quadruped 402, vibration can be used to move the quadruped 402 away from obstacles. In this regard, a vibration on the left torso of the quadruped means move right, a vibration on the right torso means move left, and vibration on the chest of the quadruped 402 means stop and turn around. In another exemplary embodiment, the quadruped 402 can be trained to respond to vibration differently and the navigational control system 600 can be reprogrammed with preset preferences as to how vibration is administered or otherwise applied with respect to the position of detected obstacles. As an example and not a limitation, the quadruped 402 can be trained that vibration on the left torso means move left, and vibration on the right torso means move right. In other exemplary embodiments, the quadruped 402 can be trained with other vibration patterns to mean other things as may be required and/or desired in a particular embodiment. The method then moves to step 1010.

In step 1010, administering or otherwise applying, the stimulation signal 706/716 to the vibrator 622 positioned on the chest side 110C when the distance sensor positioned on the chest side 110C detects the object 508 and the pathways to the right or the left of the object are blocked. In this regard, the quadruped 402 that is visually impaired is alerted through localized vibration stimulation to the relative position of the object 508 prior to inadvertently walking into the object. The method continues by returning to step 1006 as long as the navigational control system 600 is in an active mode of operation and until the quadruped 402 comes to a resting stop and the navigational control system 600 enters a passive mode of operation.

In the present invention, such administering or otherwise applying the stimulation can be limited to when the navigational control system is in an active mode of operation and the quadruped 402 is standing and or in motion.

Figure 9:
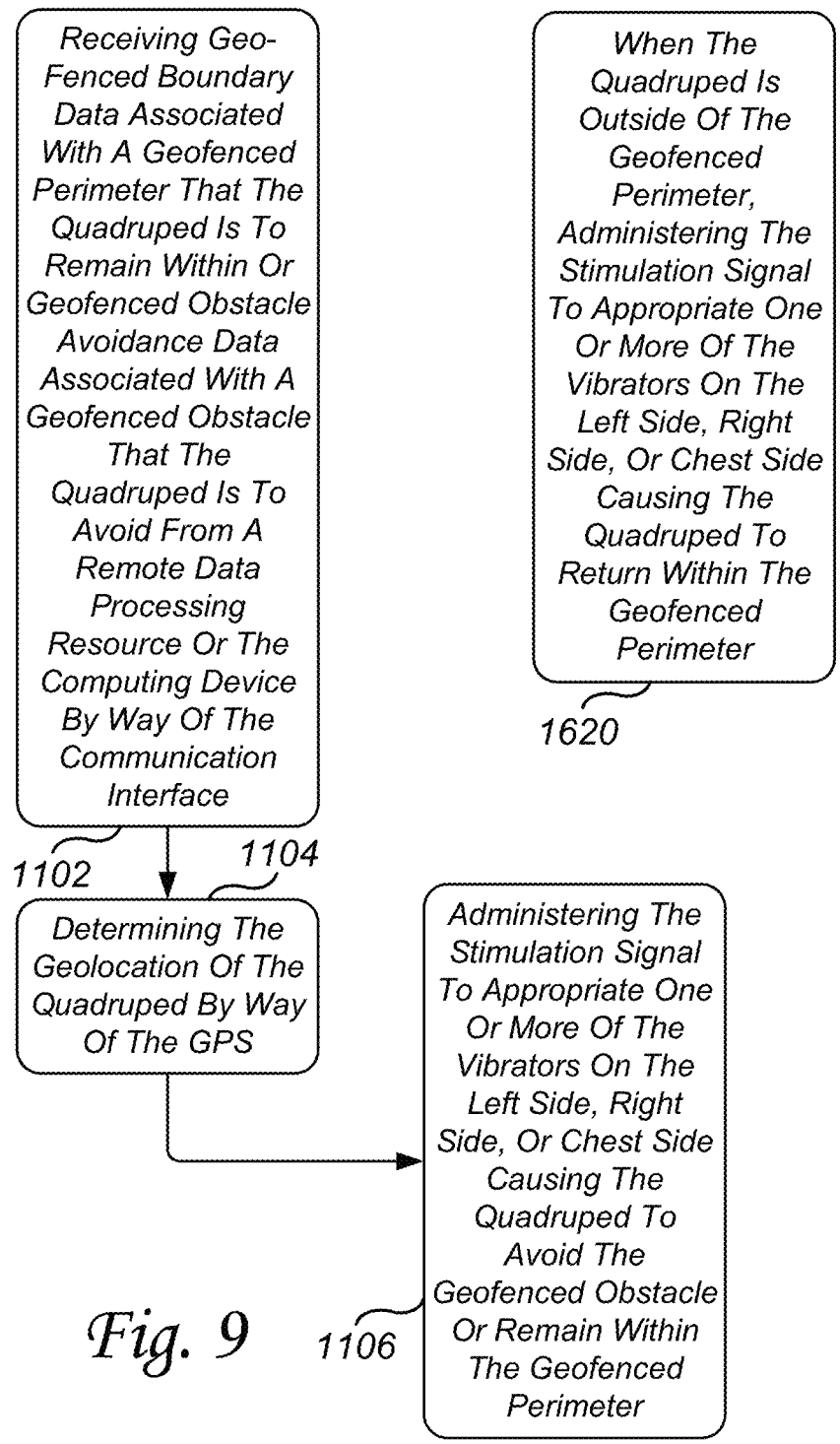
FIGS. 9-11 illustrate exemplary embodiments of a navigational safety method for a visually impaired quadruped.

Referring to FIG. 9, there are illustrated exemplary embodiments of a navigational safety method for visually impaired quadruped 402 that can be interchangeably used with the methods of the present invention.

In step 1102, receiving geofenced boundary data associated with a geofenced perimeter 512 that the quadruped 402 is to remain within or geofenced obstacle 508/518 avoidance data associated with a geofenced obstacle 508/518 that the quadruped 402 is to avoid from a remote data processing resource 806 or the computing device 802 by way of the communication interface 612. The method then moves to step 1104.

In step 1104, determining the geolocation of the quadruped 402 by way of the GPS 628. The method then moves to step 1106.

In step 1106, administering or otherwise applying the stimulation signal 706/716 to the appropriate one or more vibrators 622 on the left side 110A, right side 110B, or chest side 110C causing the quadruped 402 to change course avoiding the geofenced obstacle 508/518 or remain within the geofenced perimeter 512.

In step 1108, when the quadruped 402 is outside of the geofenced perimeter 512 the stimulation signal 706/716 is administered to the appropriate one or more of the vibrators 622 on the left side 110A, right side 110B, or chest side 110C causing the quadruped to change course and return within the geofenced perimeter 512.

Figure 10:
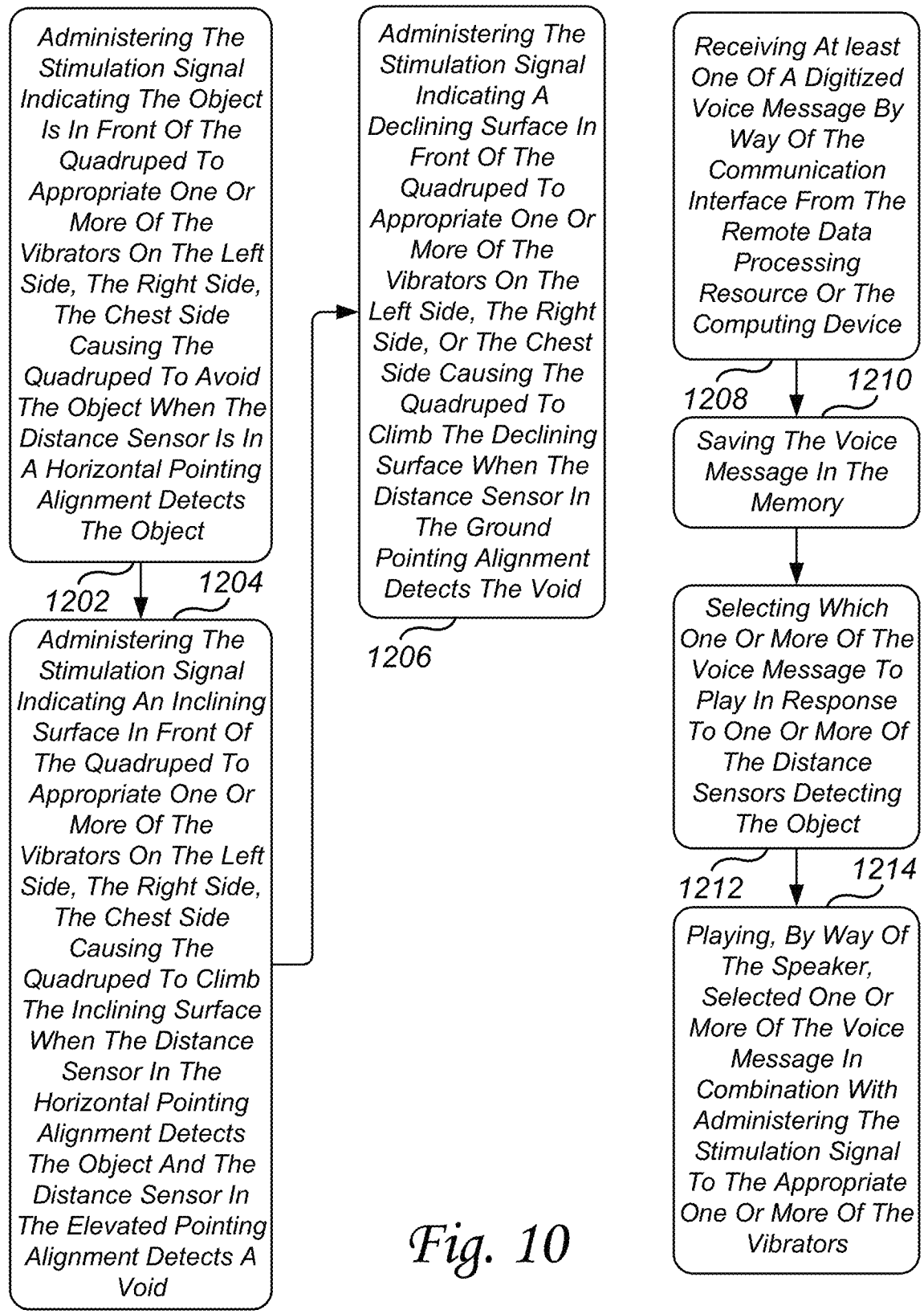

Referring to FIG. 10, there are illustrated exemplary embodiments of a navigational safety method for visually impaired quadruped 402 that can be interchangeably used with the methods of the present invention.

In step 1202, administering or otherwise applying the stimulation signal 706/716 indicating the object 508 is in front of the quadruped 402 to the appropriate one or more of the vibrators 622 on the left side 110A, the right side 110B, or the chest side 110C causing the quadruped to change course avoiding the object 508 when the distance sensor 620 is in a horizontal pointing alignment detects the object 508.

A chest sensor cluster is formed from more than one of the distance sensors 620. The chest sensor cluster orientates at least one of the distance sensors 620 in the horizontal pointing alignment when the quadruped 420 is standing, orientates at least one of the distance sensors 620 in a ground pointing alignment when the quadruped 402 is standing and orientates at least one of the distance sensors 620 in an elevated pointing alignment when the quadruped 402 is standing. The method then moves to step 1204.

In step 1204, administering the stimulation signal 706/716 indicating an inclining surface in front of the quadruped 402 to the appropriate one or more of the vibrators 620 on the left side 110A, the right side 110B, or the chest side 110C causing the quadruped 402 to climb the inclining surface when the distance sensor 620 in the horizontal pointing alignment detects the object 508 and the distance sensor in the elevated pointing alignment detects a void. The method then moves to step 1206.

In step 1206, administering the stimulation signal 706/716 indicating a declining surface in front of the quadruped 402 to appropriate one or more of the vibrators 622 on the left side 110A, the right side 110B, or the chest side 110C causing the quadruped 402 to climb the declining surface when the distance sensor 620 in the ground pointing alignment detects the void.

In block 1208, receiving at least one digitized voice message by way of the communication interface 612 from the remote data processing resource 800 or the computing device 802. An audio interface 608 has interconnected at least one speaker 610. The audio interface 608 is operationally related to the microcontroller 602. The method then moves to step 1210.

In step 1210, the voice message is saved in memory 616. The method then moves to step 1212.

In step 1212, selecting which one or more of the voice messages to play in response to one or more of the distance sensors 620 detecting the object 508.

In an exemplary embodiment, user 302 can use a computing device 802 to data communicate wirelessly voice messages to the navigational control system 600 that are played back in real-time by way of communication interface 612/audio interface and 608/speaker 610, so that user 302 can speak to the quadruped 402. The method then moves to step 1214.

In step 1214, playing, by way of the speaker 610, the selected one or more of the voice message in combination with administering or otherwise applying the stimulation signal 706/716 to the appropriate one or more of the vibrator 622.

Figure 11:
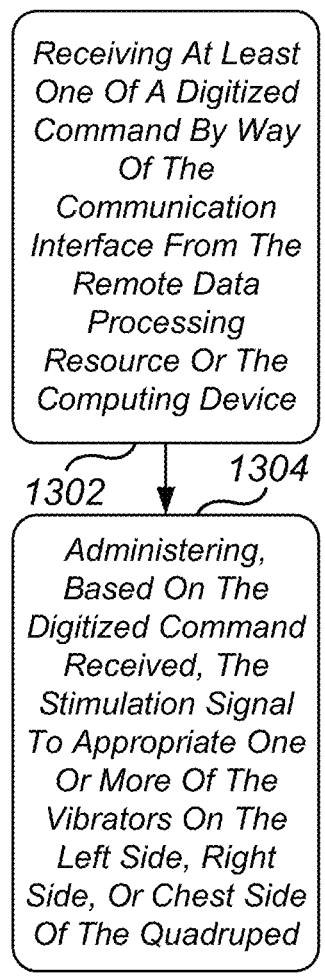

Referring to FIG. 11, there are illustrated exemplary embodiments of a navigational safety method for visually impaired quadruped 402 that can be interchangeably used with the methods of the present invention.

In step 1302, receiving at least one digitized command by way of the communication interface 612 from the remote data processing resource 806 or the computing device 802. The method then moves to step 1304.

In step 1304, administering or otherwise applying, based on the digitized command received, the stimulation signal 706/716 to appropriate one or more of the vibrator 622 on the left side 110A, right side 110B, or chest side 110C of the quadruped 402, wherein the digitized commands are used to direct the motion of the quadruped 402.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer-readable program code means for administering and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A navigational safety system for visually impaired quadrupeds comprising:
   a microcontroller;
   an onlay having a right side, a left side, a top side, a bottom side, and a chest side, the onlay is retrofittable to a harness worn by a quadruped, wherein the bottom side is removably secured to the harness such that the left side is on left side of the quadruped torso, the right side is on right side of the quadruped torso, and the chest side is on chest of the quadruped torso;
   more than one of a distance sensor is operationally related to the microcontroller and configured to determine distance between the distance sensor and an object, at least one of the distance sensor is located on each of the left side, the right side, and the chest side;
   more than one of a vibrator is configured to vibrate when energized with a stimulation signal, the vibrator is operationally related to the microcontroller and configured to provide localized vibration stimulation proximate the vibrator to the quadruped, at least one of the vibrator is located on each of the left side, the right side, and the chest side; and
   a memory is operationally related to the microcontroller, the memory is encoded with instructions that when executed by the microcontroller perform the steps of:
      administering the stimulation signal to the vibrator in a first side position on the right side or the left side depending on preset preference when the distance sensor on the right side detects the object, causing the quadruped to change course avoiding the object;
      administering the stimulation signal to the vibrator in a second side position, the second side position is on the right side or the left side opposite of the first side position when the distance sensor positioned on the left side detects the object, causing the quadruped to change course avoiding the object; and
      administering the stimulation signal to the vibrator positioned on the chest side when the distance sensor positioned on the chest side detects the object and pathways to right or left of the object are blocked, causing the quadruped to change course avoiding the object;

wherein the quadruped that is visually impaired is alerted through localized vibration stimulation to the relative position of the object prior to inadvertently walking into the object.

2. The navigational safety system in accordance with claim 1, the onlay is flexible and contoured in shape to bridge across top of front shoulders of the quadruped forming the left side and right side and descends from at least one shoulder and along neckline to chest of the quadruped forming the chest side.

3. The navigational safety system in accordance with claim 1, the stimulation signal is a frequency wave that increases in at least amplitude as the distance between the distance sensor and the object decreases.

4. The navigational safety system in accordance with claim 1, the stimulation signal is a pulse train at a constant amplitude, the pulse train increases in duration as the distance between the distance sensor and the object decreases.

5. The navigational safety system in accordance with claim 1, further comprising:
a communication interface is operationally related to the microcontroller and configured to data communicate with one or more of a computing device or one or more of a remote data processing resource.

6. The navigational safety system in accordance with claim 5, further comprising:
a global position system (GPS) is operationally related to the microcontroller, the GPS generates data related to a geolocation of the quadruped while wearing the onlay, the memory is encoded with instructions that when executed by the microcontroller perform the steps of:
receiving geofenced boundary data associated with a geofenced perimeter that quadruped is to remain within or geofenced obstacle avoidance data associated with a geofenced obstacle the quadruped is to avoid from the remote data processing resource or the computing device by way of the communication interface;
determining the geolocation of the quadruped by way of the GPS; and
administering the stimulation signal to appropriate one or more of the vibrator on the left side, right side, or chest side causing the quadruped to avoid the geofenced obstacle or remain within the geofenced perimeter.

7. The navigational safety system in accordance with claim 6, further comprising:
an audio interface having interconnected at least one speaker, the audio interface is operationally related to the microcontroller, the memory is encoded with instructions that when executed by the microcontroller perform the steps of:
receiving at least one of a digitized voice message by way of the communication interface from the remote data processing resource or the computing device;
saving the voice message in the memory;
selecting which one or more of the voice message to play in response to one or more of the distance sensors detecting the object; and
playing, by way of the speaker, selected one or more of the voice message in combination with administering the stimulation signal to the appropriate one or more of the vibrator.

8. The navigational safety system in accordance with claim 6, the memory is encoded with instructions that when executed by the microcontroller perform the steps of:
receiving at least one of a digitized command by way of the communication interface from the remote data processing resource or the computing device;
administering, based on the digitized command received, the stimulation signal to appropriate one or more of the vibrator on the left side, right side, or chest side of the quadruped, wherein the digitized commands are used to direct the motion of the quadruped.

9. The navigational safety system in accordance with claim 6, the memory is encoded with instructions that when executed by the microcontroller perform the steps of:
when the quadruped is outside of the geofenced perimeter:
administering the stimulation signal to appropriate one or more of the vibrator on the left side, right side, or chest side causing the quadruped to return within the geofenced perimeter.

10. The navigational safety system in accordance with claim 1, further comprising;
a chest sensor cluster formed from more than one of the distance sensor, the chest sensor cluster orientating at least one of the distance sensor in a horizontal pointing alignment when the quadruped is standing, and orientating at least one of the distance sensor in a ground pointing alignment when the quadruped is standing.

11. The navigational safety system in accordance with claim 1, the memory is encoded with instructions that when executed by the microcontroller perform the steps of:
administering the stimulation signal indicating the object is in front of the quadruped to appropriate one or more of the vibrator on the left side, the right side, or the chest side causing the quadruped to avoid the object when the distance sensor in the horizontal pointing alignment detects the object;
administering the stimulation signal indicating an inclining surface in front of the quadruped to appropriate one or more of the vibrator on the left side, the right side, or the chest side causing the quadruped to climb the inclining surface when the distance sensor in the horizontal pointing alignment detects the object and the distance sensor in the ground pointing alignment detects an average distance measurement with reference to ground is decreasing; and
administering the stimulation signal indicating a declining surface in front of the quadruped to appropriate one or more of the vibrator on the left side, the right side, or the chest side causing the quadruped to climb the declining surface when the distance sensor in the ground pointing alignment detects the average distance measurement with respect to ground is increasing.

12. A navigational safety method for visually impaired quadrupeds, the method comprising the steps of:
attaching an onlay to a harness, the onlay having a right side, a left side, a top side, a bottom side, and a chest side;
securing the harness and the onlay combination to a quadruped, the bottom side is removably secured to the harness such that the left side is on left side of the quadruped torso, the right side is on right side of the quadruped torso, and the chest side is on chest of the quadruped torso, more than one of a distance sensor is operationally related to a microcontroller and configured to determine distance between the distance sensor and an object, at least one of the distance sensor is located on each of the left side, the right side, and the chest side, more than one of a vibrator is configured to vibrate when energized with a stimulation signal, the vibrator is operationally related to the microcontroller and configured to provide localized vibration stimulation proximate the vibrator to the quadruped, at least one of the vibrator is located on each of the left side, the right side, and the chest side;

administering the stimulation signal to the vibrator in a first side position on the right side or the left side depending on preset preference when the distance sensor on the right side detects the object, causing the quadruped to change course avoiding the object;

administering the stimulation signal to the vibrator in a second side position, the second side position is on the left side or the right side opposite the first side position when the distance sensor positioned on the left side detects the object, causing the quadruped to change course avoiding the object; and administering the stimulation signal to the vibrator positioned on the chest side when the distance sensor positioned on the chest side detects the object and pathways to right or left of the object are blocked, causing the quadruped to change course avoiding the object;

wherein the quadruped that is visually impaired is alerted through localized vibration stimulation to the relative position of the object prior to inadvertently walking into the object.

13. The navigational safety method in accordance with claim 12, further comprising the steps of:
receiving geofenced boundary data associated with a geofenced perimeter that the quadruped is to remain within or geofenced obstacle avoidance data associated with a geofenced obstacle that the quadruped is to avoid from a remote data processing resource or a computing device by way of a communication interface;

determining a geolocation of the quadruped by way of a global position system (GPS); and administering the stimulation signal to appropriate one or more of the vibrator on the left side, right side, or chest side causing the quadruped to change course avoiding the geofenced obstacle or remaining within the geofenced perimeter.

14. The navigational safety method in accordance with claim 13, further comprising the step of:
when the quadruped is outside of the geofenced perimeter:
administering the stimulation signal to appropriate one or more of the vibrator on the left side, right side, or chest side causing the quadruped to change course and return within the geofenced perimeter.

15. The navigational safety method in accordance with claim 12, further comprising the steps of:
administering the stimulation signal indicating the object is in front of the quadruped to appropriate one or more of the vibrator on the left side, the right side, or the chest side causing the quadruped changes course avoiding the object when the distance sensor is in a horizontal pointing alignment detects the object, a chest sensor cluster is formed from more than one of the distance sensor, the chest sensor cluster orientates at least one of the distance sensor in the horizontal pointing alignment when the quadruped is standing, and orientates at least one of the distance sensor in a ground pointing alignment when the quadruped is standing;

administering the stimulation signal indicating an inclining surface in front of the quadruped to appropriate one or more of the vibrator on the left side, the right side, or the chest side causing the quadruped to climb the inclining surface when the distance sensor in the horizontal pointing alignment detects the object and the distance sensor in the ground pointing alignment detects an average distance measurement with reference to ground is decreasing; and administering the stimulation signal indicating a declining surface in front of the quadruped to appropriate one or more of the vibrator on the left side, the right side, or the chest side causing the quadruped to climb the declining surface when the distance sensor in the ground pointing alignment detects the average distance measurement with respect to ground is increasing.

16. The navigational safety method in accordance with claim 12, further comprising the steps of:
receiving at least one of a digitized voice message by way of a communication interface from a remote data processing resource or a computing device, an audio interface having interconnected at least one speaker, the audio interface is operationally related to the microcontroller; saving the voice message in a memory; (check memory location)

selecting which one or more of the voice message to play in response to one or more of the distance sensors detecting the object; and playing, by way of the speaker, selected one or more of the voice message in combination with administering the stimulation signal to the appropriate one or more of the vibrator.

17. The navigational safety method in accordance with claim 12, further comprising the steps of:
receiving at least one of a digitized command by way of a communication interface from a remote data processing resource or a computing device; and administering, based on the digitized command received, the stimulation signal to appropriate one or more of the vibrator on the left side, night side, or chest side of the quadruped, wherein the digitized commands are used to direct the motion of the quadruped.

18. A navigational safety system for visually impaired quadrupeds comprising:
a microcontroller;
a harness is worn by a quadruped;
an onlay having a right side, a left side, a top side, a bottom side, and a chest side, the bottom side of the onlay is fastened to the harness such that the left side is on left side of the quadruped torso, the right side is on right side of the quadruped torso, and the chest side is on chest of the quadruped torso;
more than one of a distance sensor operationally related to the microcontroller and configured to determine distance between the distance sensor and an object, at least one of the distance sensor is located on each of the left side, the right side, and the chest side;
more than one of a vibrator is configured to vibrate when energized with a stimulation signal, the vibrator is operationally related to the microcontroller and configured to provide localized vibration stimulation proximate the vibrator to the quadruped, at least one of the vibrator is located on each of the left side, the right side, and the chest side; and a memory is operationally related to the microcontroller, the memory is encoded with instructions that when executed by the microcontroller perform the steps of:

administering the stimulation signal to the vibrator in a first side position on the right side or the left side depending on preset preference when the distance sensor on the right side detects the object;

administering the stimulation signal to the vibrator in a second side position, the second side position is on the left side or the right side opposite of the first side position when the distance sensor positioned on the left side detects the object; and administering the stimulation signal to the vibrator positioned on the chest side when the distance sensor positioned on the chest side detects the object and pathways to right or left of the object are blocked;

wherein the quadruped that is visually impaired is alerted through localized vibration stimulation to the relative position of the object prior to inadvertently walking into the object.

19. The navigational safety system in accordance with claim 18, the stimulation signal is a pulse train at a constant amplitude, a user presets the constant amplitude, the pulse train either increases in duration as the distance between the distance sensor and the object decreases or time period between the pulse train packets decreases in duration as the distance between the distance sensor and the object decreases.

20. The navigational safety system in accordance with claim 18, further comprising:

a water-resistant compartment is integrally formed into the onlay, the microcontroller is secured in the water-resistant compartment.

* * * * *